US012128318B2

(12) United States Patent
Fujiwara et al.

(10) Patent No.: US 12,128,318 B2
(45) Date of Patent: *Oct. 29, 2024

(54) GAME APPARATUS, GAME METHOD, AND GAME PROGRAM

(71) Applicant: GREE, Inc., Tokyo (JP)

(72) Inventors: Hiroyuki Fujiwara, Tokyo (JP); Gakuto Yoshii, Tokyo (JP)

(73) Assignee: GREE, INC., Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/853,252

(22) Filed: Jun. 29, 2022

(65) Prior Publication Data
US 2022/0323868 A1    Oct. 13, 2022

Related U.S. Application Data

(63) Continuation of application No. 17/005,910, filed on Aug. 28, 2020, now Pat. No. 11,413,543.

(30) Foreign Application Priority Data

Aug. 29, 2019  (JP) ................................. 2019-156612

(51) Int. Cl.
*A63F 13/00*    (2014.01)
*A63F 13/46*    (2014.01)
(Continued)

(52) U.S. Cl.
CPC .............. *A63F 13/79* (2014.09); *A63F 13/46* (2014.09); *A63F 13/69* (2014.09); *A63F 13/847* (2014.09)

(58) Field of Classification Search
CPC .......... A63F 13/79; A63F 13/85; A63F 13/87; A63F 13/60; A63F 13/798; A63F 13/30
See application file for complete search history.

(56) References Cited

U.S. PATENT DOCUMENTS 7,805,530 B2    9/2010  Yamaguchi
2009/0054127 A1*  2/2009  Sweary ............... G07F 17/3295
463/16
(Continued)

FOREIGN PATENT DOCUMENTS

JP    2017-176690 A    10/2017
JP    2018-020143 A    2/2018
(Continued)

OTHER PUBLICATIONS

Japanese Office Action issued on Dec. 3, 2019 in Japanese Application No. 2019-156612; 8 pages.
(Continued)

*Primary Examiner* — David L Lewis
*Assistant Examiner* — Eric M Thomas
(74) *Attorney, Agent, or Firm* — Maier & Maier, PLLC

(57) ABSTRACT

A game apparatus for selectively providing motivation to specific users to continue playing a game, which may include a log information retrieval unit that retrieves log information associated with user identification information related to a plurality of registered users, a game processing unit that starts playing a game and progresses the game based on operation information by the registered users, an index value calculation unit that calculates, for each of the registered users, an index value indicating a possibility that the registered users will not perform a predetermined action within a predetermined period based on the log information retrieved by the log information retrieval unit, and a privilege granting unit that grants a predetermined privilege providing an advantage in the game to a specific user of the plurality of registered users based on the index value calculated by the index value calculation unit for each of the registered users.

20 Claims, 14 Drawing Sheets

(51) Int. Cl.
  *A63F 13/69* (2014.01)
  *A63F 13/79* (2014.01)
  *A63F 13/847* (2014.01)

(56) References Cited

U.S. PATENT DOCUMENTS

| | | | |
|---|---|---|---|
| 2009/0170608 A1* | 7/2009 | Herrmann | A63F 9/24 463/42 |
| 2013/0045804 A1 | 2/2013 | Ruke | |
| 2016/0256775 A1* | 9/2016 | Gustafson | A63F 13/493 |

FOREIGN PATENT DOCUMENTS

| | | | |
|---|---|---|---|
| JP | 2018-094429 A | 6/2018 |
| JP | 2019-075094 A | 5/2019 |
| JP | 2019-122739 A | 7/2019 |

OTHER PUBLICATIONS

Japanese Office Action issued on Mar. 17, 2020 in Japanese Application No. 2019-156612; 13 pages.

Shoichi Higa, "Gaming Device, Game Method, and Game Program", (ゲーム運営をディープラーニングでサポートするYOKOZUNAdataの全貌, モリカトロンAIラボ), Jun. 21, 2019, Searched Mar. 3, 2020, URL: https://morikatron.ai/2019/06/yokozuna-data/, 18 pages.

Office Action issued on Jun. 7, 2022, in connection with corresponding Japanese Application No. 2020-118783 (4 pages) including machine-generated English Translation.

Office Action issued on Oct. 18, 2022 in corresponding Japanese Patent Application No. 2020-118783; 4 pages.

Office Action issued on Oct. 3, 2023, in corresponding Japanese Patent Application No. 2022-197305; 10 pages.

* cited by examiner

FIG.4

| USER ID | USER NAME | PASSWORD | TELEPHONE NUMBER | POSSESSED COIN | INFORMATION RELATED TO GAME | INFORMATION RELATED TO SNS | ... |
|---|---|---|---|---|---|---|---|
| U 0 1 | USER 01 | *** | *** | *** | *** | *** | ... |
| U 0 2 | USER 02 | *** | *** | *** | *** | *** | ... |
| U 0 3 | USER 03 | — | *** | *** | *** | *** | ... |
| ... | ... | ... | ... | ... | ... | ... | ... |

FIG.5

| USER ID | RANK | INFORMATION RELATED TO OWNED GAME MEDIUM | INFORMATION RELATED TO USED GAME MEDIUM | FRIEND INFORMATION |
|---------|------|------------------------------------------|-----------------------------------------|---------------------|
| U01 | *** | *** | *** | *** |
| U02 | *** | *** | *** | *** |
| ... | ... | ... | ... | ... |

*FIG.6*

| | U03 |
| U02 | |
| U01 | |
| OPERATION DATE AND TIME | OPERATION CONTENT |
| * * * | * * * |
| × | ° |
| × | ° |
| × | ° |

| USER ID | LEAVING PROBABILITY AFTER ONE DAY | LEAVING PROBABILITY AFTER TWO DAYS | LEAVING PROBABILITY AFTER THREE DAYS | ... | LEAVING PROBABILITY AFTER SEVEN DAYS | ... | LEAVING PROBABILITY AFTER 30 DAYS | ... | LEAVING PROBABILITY AFTER 60 DAYS |
|---|---|---|---|---|---|---|---|---|---|
| 1 | 5% | 10% | 15% | ... | 30% | ... | 65% | ... | 70% |
| 2 | 10% | 15% | 20% | ... | 35% | ... | 70% | ... | 75% |
| 3 | 15% | 20% | 25% | ... | 40% | ... | 75% | ... | 80% |
| 4 | 20% | 25% | 30% | ... | 45% | ... | 80% | ... | 85% |
| 5 | 25% | 30% | 35% | ... | 50% | ... | 85% | ... | 90% |
| 6 | 60% | 63% | 66% | ... | 67% | ... | 69% | ... | 74% |
| 7 | 75% | 78% | 81% | ... | 82% | ... | 84% | ... | 87% |
| 8 | 80% | 83% | 86% | ... | 87% | ... | 89% | ... | 92% |
| 9 | 90% | 91% | 92% | ... | 93% | ... | 96% | ... | 98% |
| 10 | 90% | 91% | 92% | ... | 93% | ... | 96% | ... | 98% |

FIG.8

| USER ID | LEAVING PROBABILITY AFTER ONE DAY | LEAVING PROBABILITY AFTER TWO DAYS | LEAVING PROBABILITY AFTER THREE DAYS | ... | LEAVING PROBABILITY AFTER SEVEN DAYS | ... | LEAVING PROBABILITY AFTER 30 DAYS | ... | LEAVING PROBABILITY AFTER 60 DAYS |
|---|---|---|---|---|---|---|---|---|---|
| 1 | 5% | 10% | 15% | ... | 30% | ... | 65% | ... | 70% |
| 2 | 10% | 15% | 20% | ... | 35% | ... | 70% | ... | 75% |
| 3 | 15% | 20% | 25% | ... | 40% | ... | 75% | ... | 80% |
| 4 | 20% | 25% | 30% | ... | 45% | ... | 80% | ... | 85% |
| 5 | 25% | 30% | 35% | ... | 50% | ... | 85% | ... | 90% |
| 6 | 60% | 63% | 68% | ... | 67% | ... | 69% | ... | 74% |
| 7 | 75% | 78% | 81% | ... | 82% | ... | 84% | ... | 87% |
| 8 | 80% | 83% | 86% | ... | 87% | ... | 89% | ... | 92% |
| 9 | 90% | 91% | 92% | ... | 93% | ... | 96% | ... | 98% |
| 10 | 90% | 91% | 92% | ... | 93% | ... | 96% | ... | 98% |

FIG.9

| SPECIFIC EVENT ID | USER ID OF SPECIFIC USER | REWARD CONTENT | END CONDITION |
|---|---|---|---|
| 000A | *** | *** | *** |
| 000B | *** | *** | *** |
| 000C | *** | *** | *** |

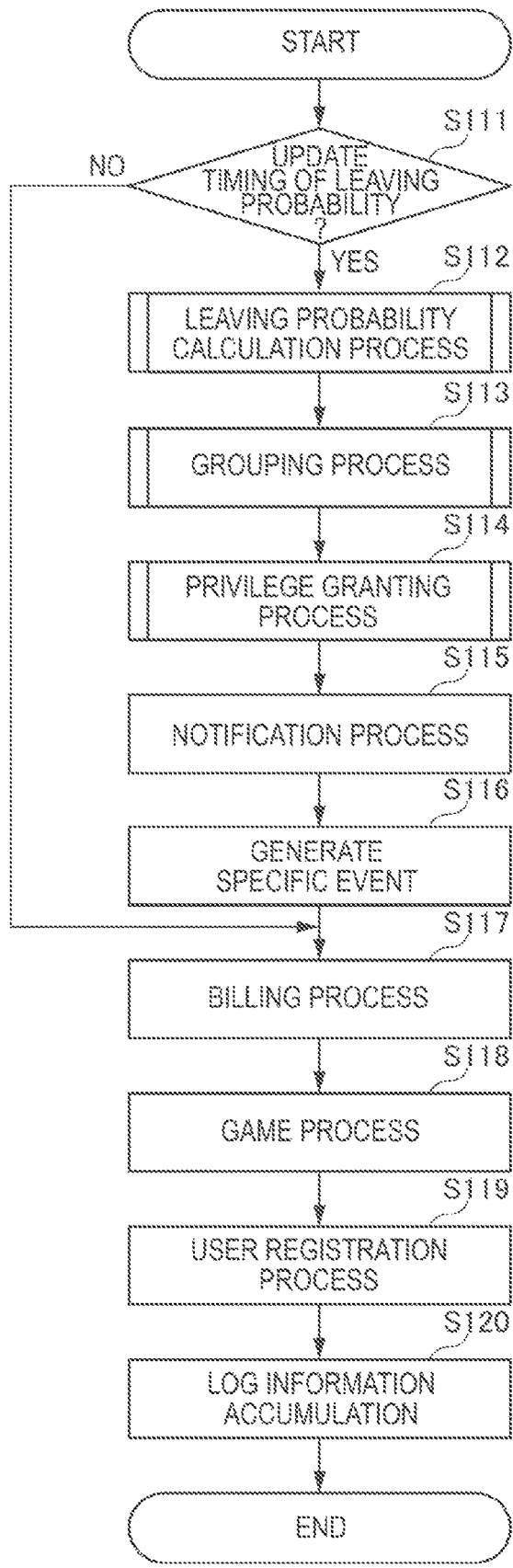

GAME APPARATUS, GAME METHOD, AND GAME PROGRAM

CLAIM OF PRIORITY

This application claims priority from U.S. patent application Ser. No. 17/005,910, filed on Aug. 28, 2020, entitled "GAME APPARATUS, GAME METHOD, AND GAME PROGRAM," which in turn claims priority from Japanese Patent Application No. 2019156612A, filed on Aug. 29, 2019, the entire contents of which are hereby incorporated by reference.

FIELD

The present disclosure relates to a game apparatus, a game method, and a game program.

BACKGROUND

Existing technology provides for collecting a history of behavior related to a game including login, game play, and billing action of a large number of players, and estimating a billing probability corresponding to a possibility that a player will perform a billing action (for example, see Patent Literature 1). According to such technology, a system may determine, according to the billing probability of the player, a pattern of billing offer display which may allow for immediately executing the billing action when an operation is input, which may then be displayed on a user terminal of a target player.

Patent Literature 1, JP-A-2017-176690, provides such a technique.

SUMMARY

Technical Problem

However, in the conventional technology described above, it may be difficult to motivate a specific user, such as a user whose game playing frequency is decreasing, to continue playing the game.

Therefore, in one exemplary embodiment, an object of an embodiment provided herein may be to give a specific user motivation to continue playing a game.

Solution to Problem

In one exemplary embodiment, provided is a game apparatus which may be configured to provide:
  a log information retrieval unit that retrieves log information associated with user identification information related to a plurality of registered users,
  a game processing unit that starts playing a game and progresses the game based on operation information by the registered users,
  an index value calculation unit that calculates, for each of the registered users, an index value indicating a possibility that the registered users will not perform a predetermined action within a predetermined period based on the log information retrieved by the log information retrieval unit, and
  a privilege granting unit that grants a predetermined privilege, which may be advantageous in the game, to a specific user of the plurality of registered users based on the index value calculated by the index value calculation unit for each of the registered users.

In one exemplary embodiment, according to an embodiment provided herein, it may be possible to give a specific user motivation to continue playing a game.

BRIEF DESCRIPTION OF THE DRAWINGS

FIG. 4 is an explanatory diagram of exemplary data in a user information database;

FIG. 5 is an explanatory diagram of exemplary information related to a game;

FIG. 6 is an explanatory diagram of exemplary data in a log information database;

FIG. 7 is an explanatory diagram of exemplary data in an index value database;

FIG. 8 is an explanatory diagram of an exemplary embodiment of a grouping process;

FIG. 9 is an explanatory diagram of exemplary data in a specific event database;

FIG. 11 is a flowchart illustrating an example of a process associated with a continuation promotion process by the server apparatus;

DETAILED DESCRIPTION OF EMBODIMENTS

Hereinafter, each embodiment will be described in detail with reference to the accompanying drawings.

(Outline of Game System)

Figure 1:
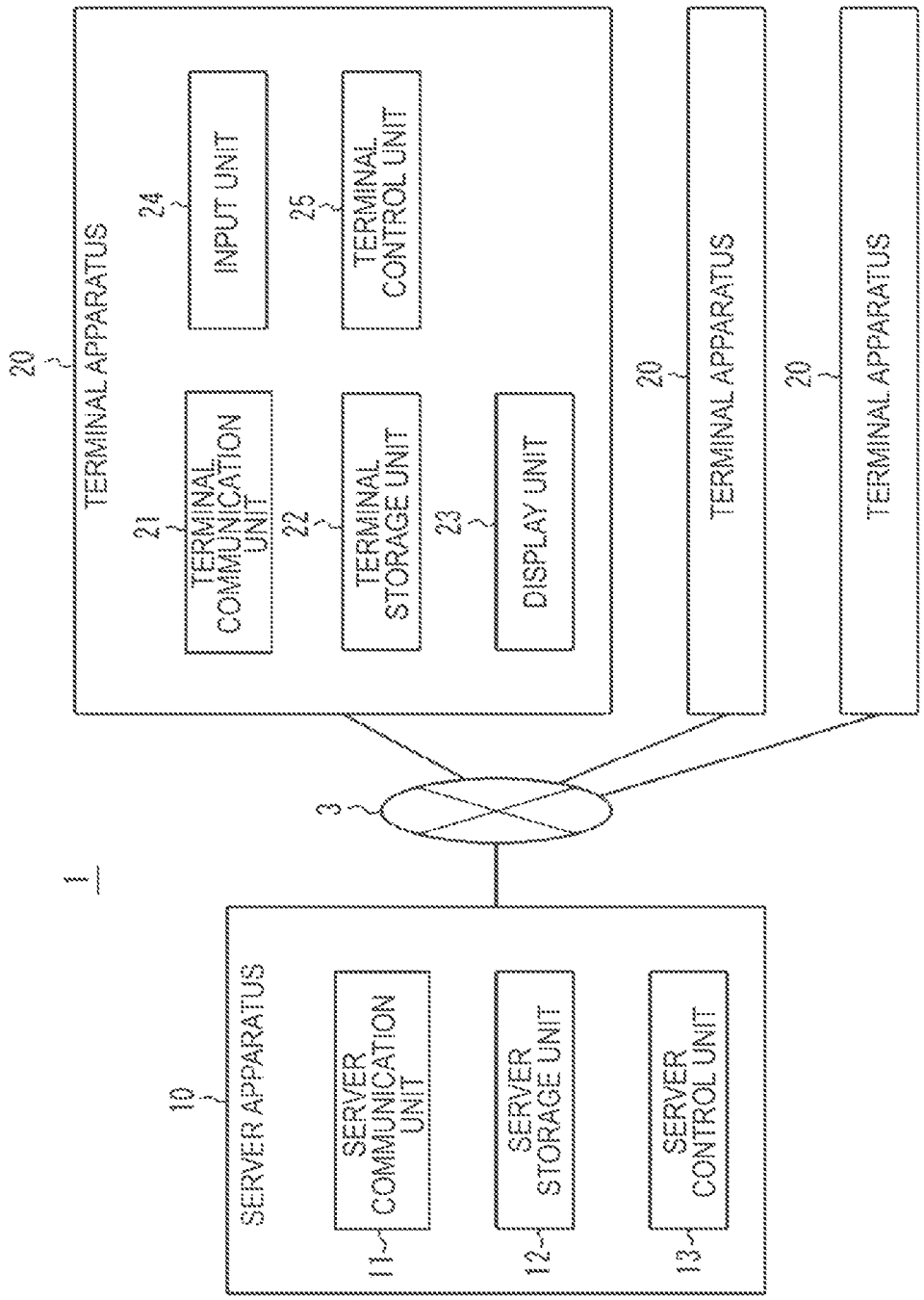
FIG. 1 is a block diagram of a game system according to the present embodiment.

An outline of a game system 1 according to the present embodiment may be described with reference to FIG. 1. FIG. 1 may be a block diagram of the game system 1 according to the present embodiment. The game system 1 may include a server apparatus 10 and one or more terminal apparatuses 20. In FIG. 1, for the sake of simplicity, three terminal apparatuses 20 are illustrated. However, the number of terminal apparatuses 20 may be two or more.

The server apparatus 10 may be an information processing apparatus such as a server managed by a service operator. In the present embodiment, as an example, the server apparatus 10 may implement a so-called service platform and may provide various services via the service platform. Specifically, as an example, the server apparatus 10 may provide an application portal site (hereinafter also simply referred to as "site"), application software (hereinafter also simply referred to as "application"), and a social network function (hereinafter also simply referred to as "SNS function") for a registered user (and a guest user as necessary). Hereinafter, the registered user (and the guest user as necessary) may also be simply referred to as a "user".

The number of sites provided by the server apparatus 10 may be arbitrary. In the present embodiment, as an example, it may be presumed that one site (hereinafter, also referred to as "site A") may be provided.

The type and number of applications provided by the server apparatus 10 are arbitrary. In the present embodiment, as an example, the application provided by the server apparatus 10 may include an application for one or more games (hereinafter also simply referred to as "game application"), and may include various other applications for using digital content (digital content other than the game application). The game application, etc. may be executable via the site A, or may be executable offline. Hereinafter, the game refers to a game related to the game application provided by the server apparatus 10.

The type and number of SNS functions provided by the server apparatus 10 are arbitrary. Here, the SNS function may be a function such as diary, chat, message board/bulletin board (community), comment, messenger, friend request, or object transmission (gift transmission). The SNS function may be executable via the site A.

For example, the terminal apparatus 20 may be an information processing apparatus used by the user, such as a mobile phone, a smartphone, a tablet terminal, a PC (Personal Computer), or a game apparatus. The terminal apparatus 20 can execute various applications according to the present embodiment. Various applications may be received by the terminal apparatus 20 from the server apparatus 10 or another predetermined application distribution server via a network 3, or stored in advance in a storage medium such as a storage device included in the terminal apparatus 20 or a memory card readable by the terminal apparatus 20. The server apparatus 10 and the terminal apparatus 20 are communicably connected via the network 3. For example, the server apparatus 10 and the terminal apparatus 20 may cooperate to execute various types of processes related to a service.

Note that the network 3 may include a wireless communication network, the Internet, a VPN (Virtual Private Network), a WAN (Wide Area Network), a wired network, or any combination thereof.

(Configuration of Server Apparatus)

A configuration of the server apparatus 10 may be specifically described. The server apparatus 10 may include a server computer. The server apparatus 10 may be implemented in cooperation with a plurality of server computers.

The server apparatus 10 may include a server communication unit 11, a server storage unit 12, and a server control unit 13.

The server communication unit 11 may include an interface that communicates with an external apparatus wirelessly or by wire and transmits and receives information. The server communication unit 11 may include, for example, a wireless LAN (Local Area Network) communication module or a wired LAN communication module. The server communication unit 11 can transmit and receive information to and from the terminal apparatus 20 via the network 3.

The server storage unit 12 may include, for example, a primary storage device and a secondary storage device. For example, the server storage unit 12 may include a semiconductor memory, a magnetic memory, or an optical memory. The server storage unit 12 may store various types of information and programs used for processing related to a service. At least a part of the information and programs stored in the server storage unit 12 may be shared and synchronized with the terminal apparatus 20. Hereinafter, an example of information stored in the server storage unit 12 may be specifically described.

The server control unit 13 may include one or more processors. The processor may include a general-purpose processor that may implement a specific function by reading a specific program, and a dedicated processor specialized for a specific process. The server control unit 13 may control an overall operation of the server apparatus 10. Details of the server control unit 13 may be described later.

(Configuration of Terminal Apparatus)

A configuration of the terminal apparatus 20 may be specifically described. As illustrated in FIG. 1, the terminal apparatus 20 may include a terminal communication unit 21, a terminal storage unit 22, a display unit 23, an input unit 24, and a terminal control unit 25.

The terminal communication unit 21 may include an interface that communicates with an external apparatus wirelessly or by wire and transmits and receives information. The terminal communication unit 21 may include, for example, a wireless communication module, a wireless LAN communication module, or a wired LAN communication module, etc. corresponding to a mobile communication standard such as LTE (Long Term Evolution) (registered trademark). The terminal communication unit 21 can transmit and receive information to and from the server apparatus 10 via the network 3.

The terminal storage unit 22 may include, for example, a primary storage device and a secondary storage device. For example, the terminal storage unit 22 may include a semiconductor memory, a magnetic memory, or an optical memory. The terminal storage unit 22 may store various types of information and programs received from the server apparatus 10 and used for a process related to a service. The information and the programs used for processing related to the service may be retrieved from an external apparatus via the terminal communication unit 21. For example, the game application may be retrieved from a predetermined application distribution server.

The display unit 23 may include a display device such as a liquid crystal display or an organic EL (Electro-Luminescence) display. The display unit 23 can display various screens.

The input unit 24 may include, for example, an input interface including a touch panel integrally provided with the display unit 23. The input unit 24 can receive a user input to the terminal apparatus 20. Further, the input unit 24 may include a physical key, or may further include an arbitrary input interface such as a pointing device such as a mouse.

The terminal control unit 25 may include one or more processors. The terminal control unit 25 may control the overall operation of the terminal apparatus 20. Hereinafter, an example of an operation of the terminal control unit 25 may be specifically described.

The terminal control unit 25 may transmit and may receive information via the terminal communication unit 21. For example, the terminal control unit 25 may receive various types of information and programs used for processing related to the service from at least one of the server apparatus 10 and another external server. The terminal control unit 25 may store the received information and programs in the terminal storage unit 22.

The terminal control unit 25 may activate the site A, a game application in the site A, etc. in response to a user operation. The terminal control unit 25 may cooperate with the server apparatus 10 to execute processing related to the service. For example, the terminal control unit 25 may cause the display unit 23 to display various screens associated with processing related to the service. For example, a GUI (Graphical User Interface) for detecting the user operation may be displayed on the screen. The terminal control unit 25 can detect the user operation on the screen via the input unit 24.

In the present embodiment, as an example, one or more games can be played by each user via the site A. One of the various games is, for example, a game described below with reference to FIG. 2.

(Outline of Game Application)

A description may be given of an outline of an example of a game application according to the present embodiment. The game according to the present embodiment may include one or more game parts. At least one game part among the one or more game parts may be executed using a game content.

The game content may be electronic data used in the game and may include any medium such as a card, an item, points, virtual currency, a ticket, a character, an avatar, or a parameter. In addition, the game content may be game-associated information such as level information, status information, parameter information (health point value, attack power, etc.), or ability information (skill, ability, spell, job, etc.). In addition, the game content may be electronic data that can be acquired, owned, used, managed, exchanged, synthesized, enhanced, sold, disposed of, or donated in the game by the user, and a usage mode of the game content may not be limited to the one explicitly described in this specification.

Hereinafter, unless otherwise specified, "the game content owned by the user" refers to a game content associated with a user ID that can uniquely identify the user as an owned game content. Further, "granting the game content to the user" means associating a game content with a user ID as an owned game content. In addition, "discarding the game content owned by the user" indicates that an association between the user ID and the owned game content may be canceled. In addition, "consuming the game content owned by the user" indicates that some effect or influence can be generated in the game in accordance with the cancellation of the association between the user ID and the owned game content. Further, "selling the game content owned by the user" indicates that the association between the user ID and the owned game content may be canceled, and another game content (for example, virtual currency, item, etc.) may be associated with the user ID as the owned game content. In addition, "transferring a game content owned by a user A to a user B" indicates that association between a user ID of the user A and the owned game content may be canceled, and the game content may be associated with a user ID of the user B as an owned game content. In addition, "creating a game content" indicates defining or determining at least a part of information related to the game content.

The game part may be content that can be played by the user in the game, and may include, for example, a quest, a mission, a mini game, training, enhancement, and composition of a game content, a game content acquisition event, a virtual space search event, and a competition event with an opponent (for example, another user, an enemy character, an enemy building, etc.). One or more predetermined tasks (game tasks) may be set for each game part. For example, when it is determined that one or more game tasks set in the game part played by the user are successfully achieved, for example, a game content, etc. may be granted to the user as a reward. As the game task, for example, it may be possible to adopt any tasks according to content of the game part such as a task of winning a competition with an enemy character, a task of reaching a goal point in a virtual space, and a task of not causing a character of the user to enter a predetermined state (for example, incapacitated state) until a predetermined time elapses. In addition, achieving a specific task (completion task) among the one or more game tasks set in the game part may also be referred to as clearing the game part. When the user playing the game part succeeds in achieving the completion task, it may be determined that the game part may be cleared, and the game part may be ended.

The one or more game parts may include a single-play game part and a multi-play game part. For example, the single-play game part may include a game part executed based on a user operation on one terminal apparatus 20 used by one user (for example, a game part for one person). For example, one terminal apparatus 20 alone may execute or one terminal apparatus 20 and the server apparatus 10 may cooperate to execute the single-play game part. On the other hand, for example, the multi-play game part may include a game part executed common to the two or more users (for example, a game part for a plurality of people) executed based on user operations on the two or more terminal apparatuses 20 used by the two or more users, respectively. For example, the game part common to the two or more users may include a game part in which at least a part of progress processing and at least a part of a processing result of the game part are commonly applied to the two or more users. For example, two or more terminal apparatuses 20 may cooperate or two or more terminal apparatuses 20 and the server apparatus 10 may cooperate to execute the multi-play game part. One game part may support both a single-player game and a multi-player game.

As an example, one of games according to the present embodiment may include, for example, a competitive game part having an element of a lateral scroll type action game and an element of a competitive game in which a game content may be used to compete with an opponent. The user may select one or more game media to be used for the competitive game part from game media owned by the user (owned game media). Hereinafter, each game content used for the competitive game part may also be referred to as a first game content. The one or more first game media may collectively be referred to as a deck or a team. The opponent may be an automatically operated game content such as an NPC (Non-Player Character). However, the opponent may not be limited thereto. For example, the opponent may be a game content operated by another user. In one competitive game part, the number of opponents may be arbitrarily set.

Figure 2:
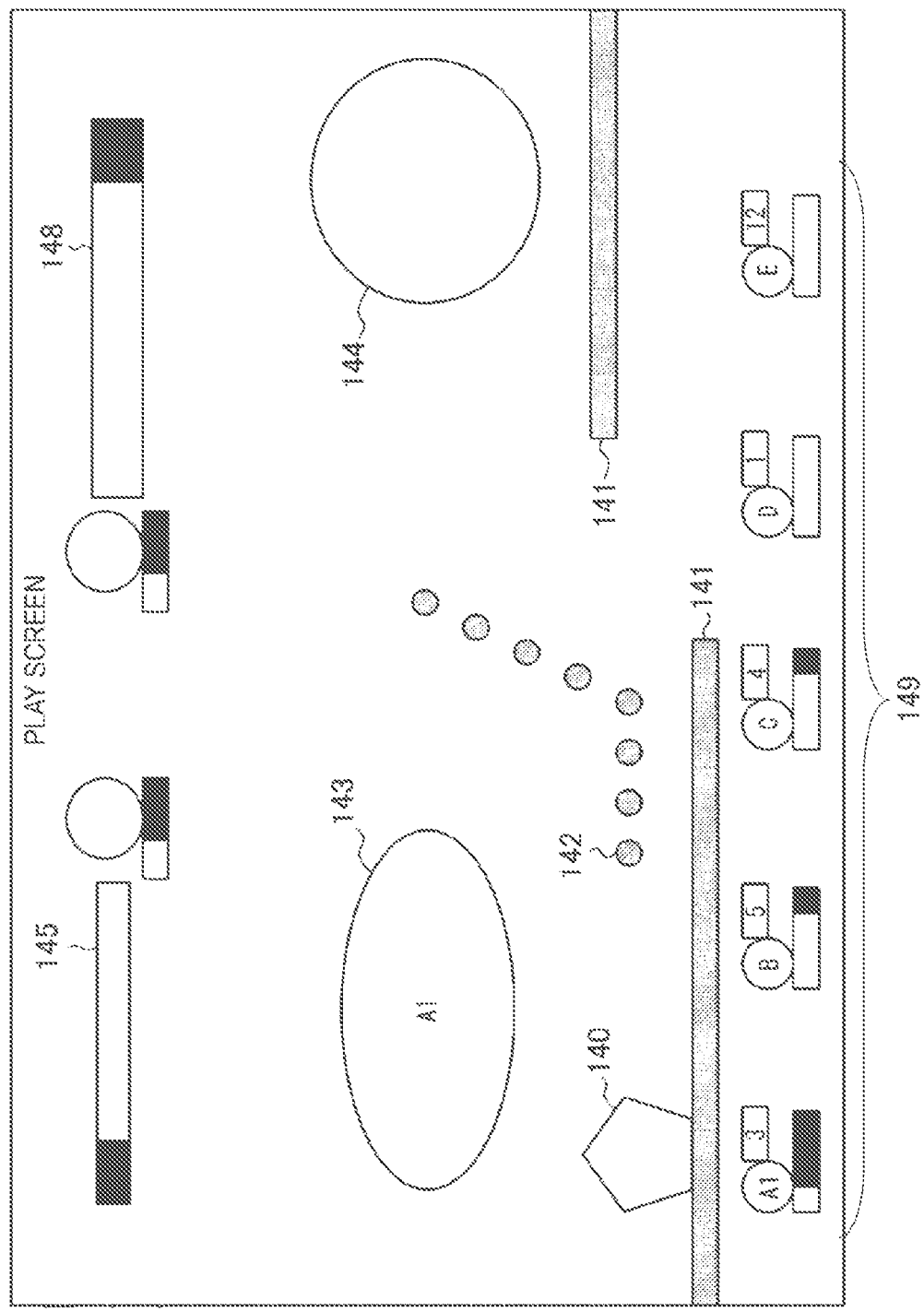
FIG. 2 is a diagram illustrating an example of a play screen for describing an outline of a competitive game part.

An outline of the competitive game part according to the present embodiment may be outlined with reference to FIG. 2. FIG. 2 illustrates an example of a play screen for describing the outline of the competitive game part.

For example, the user playing the single-play competitive game part using the terminal apparatus 20 may operate a moving object 140 disposed in a virtual space to acquire a predetermined item while avoiding an obstacle, etc. The moving object 140 may correspond to a predetermined game content (second game content). The second game content may include, for example, a motorcycle, an automobile, a person, etc. traveling on a road surface 141. In response to acquisition of an item 142, game media (first game media A1, B, C, D, and E) included in a deck may perform predetermined behavior (for example, attacking an opponent). The behavior of the first game media may damage the opponent (an object 144 related to the opponent may be displayed in FIG. 2). On the other hand, for example, the opponent may perform predetermined behavior (for example, an attack on the user) at predetermined time intervals. The behavior of the opponent may cause damage to the user (an object 143 related to the user may be displayed in FIG. 2). Predetermined parameters (total HP and HP) decreasing by amounts of damage given may be set for the user and the opponent, respectively. Note that in FIG. 2, an image area 145 may be an area for displaying the rest of the total HP with a gauge, an image area 148 may be an area for displaying the rest of HP of the opponent with a gauge, and an image area 149 may be an area for displaying states of the respective first game media included in the deck. When the parameter of the opponent decreases to a predetermined value (for example, zero), it may be determined that the user wins. On the other hand, when the parameter of the user decreases to a predetermined value (for example, zero), it may be determined that the user loses. When it may be determined that the user wins or loses, the competitive game part may be ended.

Meanwhile, the multi-play competitive game part may be executed similarly to the above-described single-play competitive game part except that two or more users compete with a common opponent. Specifically, each of the two or more users may play a common competitive game part using the terminal apparatus 20 thereof. Each of the two or more users may operate the second game content in the virtual space as described above. A virtual space common to the two or more users may be used, or an independent virtual space may be used for each user. For example, the first game media included in the deck of each of the two or more users may attack a common opponent. The above-described parameter of the opponent may be commonly applied to the two or more users. For example, the parameter of the opponent may be synchronized between the plurality of terminal apparatuses 20 used by the two or more users, respectively. When the parameter of the opponent decreases to a predetermined value (for example, zero), it may be determined that the two or more users win. On the other hand, when the parameter of each of the two or more users decreases to a predetermined value (for example, zero), it may be determined that the two or more users lose. When it is determined that the two or more users win or lose, the competitive game part may be ended.

Note that the above-described game may be merely an example, and the present embodiment can be applied to a fishing game, a run game, a dungeon game, an Othello game, a fighting game, a city-building game, a horse racing game, a sports game such as a baseball game, a shooting game, etc. in addition to a general RPG (Role Playing Game).

(Continuation Promotion Process)

In the present embodiment, the server apparatus 10 may further have a function for giving a motivation to continue playing the game to a specific user (hereinafter, also referred to as "continuation promoting function"). In the following description, for the sake of description, unless otherwise specified, a description may be given of the continuation promotion function related to a specific game (one of the one or more games that can be played on the site A, for example, the game described above with reference to FIG. 2). The continuation promotion function may be implemented for each game, or may be implemented only for a specific game of the one or more games playable on the site A. Hereinafter, a game refers to a specific game unless otherwise specified.

Figure 3:
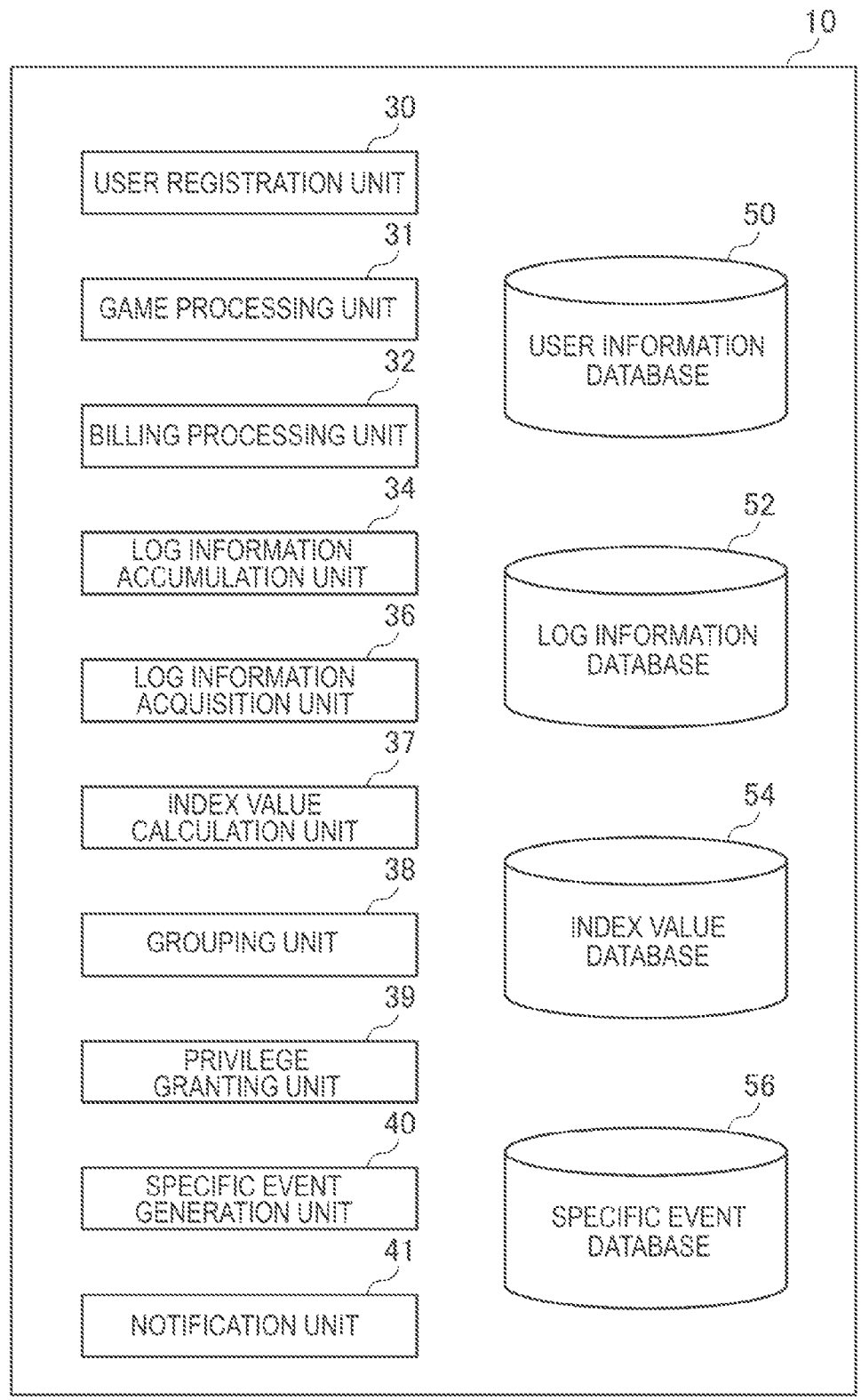
FIG. 3 is a functional block diagram related to a function associated with an exemplary embodiment of a continuation promotion function among various functions implemented by a server apparatus.

FIG. 3 may be a functional block diagram related to a function associated with the continuation promotion function among various functions implemented by the server apparatus 10. FIG. 4 may be an explanatory diagram of data in a user information database 50. In FIG. 4 (the same may be applied to FIG. 5 and FIG. 6 described later), "***" means that some information may be stored, and " . . . " means repetition of similar information. FIG. 5 may be an explanatory diagram of information related to the game. FIG. 6 may be an explanatory diagram of data in a log information database 52. FIG. 7 may be an explanatory diagram of data in an index value database 54. FIG. 8 may be an explanatory diagram of a grouping process. FIG. 9 may be an explanatory diagram of data in a specific event database 56.

The server apparatus 10 may cooperate with each terminal apparatus 20 to implement various functions described below. As illustrated in FIG. 3, the server apparatus 10 may include a user registration unit 30, a game processing unit 31, a billing processing unit 32, a log information accumulation unit 34, a log information retrieval unit 36, an index value calculation unit 37, a grouping unit 38, a privilege granting unit 39, a specific event generation unit 40, a notification unit 41, the user information database 50, the log information database 52, the index value database 54, and the specific event database 56. The user registration unit 30 to the notification unit 41 can be implemented by the server communication unit 11 and the server control unit 13 described above, and the user information database 50 to the specific event database 56 can be implemented by the server storage unit 12 described above.

Note that distinction between respective functional units from the user registration unit 30 to the notification unit 41 may be for convenience of description, and some or all functions of one specific functional unit (functions described below) may be implemented by another functional unit. This description may be similarly applied to the user information database 50 to the specific event database 56, and some or all functions of one specific database (functions described below) may be implemented by another database.

The user registration unit 30 may register user information related to the user using the site A in the user information database 50. Note that a user registered in the user information database 50 may be an example of a registered user.

As illustrated in FIG. 4, the user information may include a user name, a password, a telephone number, a possessed coin, information related to a game, information related to an SNS, etc. in a manner associated with a user ID (an example of user identification information). The user information may include, for example, initially registered information such as the user ID or the user name, and information accumulated afterwards such as information related to a game. In addition, the user information may additionally include an email address, etc. of the user.

The user ID may be information that can uniquely identify the user. Hereinafter, the user ID may also be simply referred to as the user.

The user name may be information indicating a name of the user. Unlike the user ID, the user name may not be able to uniquely identify the user. The user name may be arbitrarily determined and changed according to a user operation on the terminal apparatus 20. Note that the user name may be initially registered information and may be essential information that needs to be registered.

The password may be a password that allows logging in to the site A by the user name. A plurality of types of passwords may be set, according to the intended use of each. The password may be initially registered information and may be essential information that needs to be registered.

The telephone number may be, for example, a telephone number for short message service (SMS) authentication. The telephone number may be initially registered information, and may be essential information needs to be registered or may be arbitrary information.

The possessed coin value may represent the number of coins possessed by the user (the number of coins currently available). Further, in the present embodiment, as an example, it may be presumed that the coins can be used on the site A (hereinafter referred to as "coin(s) A"), and the user can provide digital content and receive various compensations in the game by consuming the coin(s) A possessed. For example, the user can gain a desired first game content or gain a desired item by consuming the coin(s) A possessed. In addition, for example, the gacha can be turned by consuming the coin(s) A possessed. Note that in this case, the coin(s) A may be an example of the game content. In a modification, the coin(s) A may be a game content that can be used only in the game. The user has an initial value of the possessed coin, for example, 0. The possessed coin value can be updated by the billing processing unit 32 as described later.

As illustrated in FIG. 5, the information related to the game may include a rank, information related to an owned game content, information related to a used game content, and friend information for each user ID.

The rank may be a parameter that may indicate a skill level of the user related to the game. In the present embodiment, a rank value may increase according to play of the game by the user. The higher the rank, the higher the skill level of the user related to the game.

The information related to the owned game content may include various types of information unique to the game content owned by the user in the game (owned game content). When the game content is acquired by the user, the game content may be associated with the user as the owned game content. Even though details of the information related to the owned game content may be omitted, a game content name, rarity, level, cost, HP (HitPoint), attack power, recovery power, etc. may be included for each game content ID.

The information related to the used game content may be information indicating a game content (first game content) to be used by the user in the competitive game part. The first game content may be selected from the owned game media. In the present embodiment, for example, each of a maximum of five game media selected from one or more owned game media may be associated with the user as a first game content. Therefore, one game content can be the owned game content and the first game content at the same time. The first game content may be selected automatically or in response to a user operation, for example, in a dedicated game part. For example, the dedicated game part may include a game part that may perform so-called deck formation or team formation. A maximum of five first game media shown in the information related to the used game content may be included in one deck. The information related to the used game content may include information about a plurality of decks.

The friend information may represent a user ID having a friend relationship in the game. For example, when the user A has a friend relationship with the users B and C, friend information associated with the user A may include user IDs of the users B and C. Note that the friend relationship may be realized through friend request, etc. In this way, the friend information may include a user ID of another user unidirectionally or bidirectionally associated with the user. Note that users having a friend relationship may be able to communicate with each other, for example, during the game, by sending and receiving messages. Note that in the information related to the user, instead of or in addition to the friend information, information indicating a group to which the user belongs (for example, a guild or a party) may be included.

Note that content of the information related to the game may not be limited to the one described above. For example, the information related to the user may further include information indicating a predetermined point value held by the user in the game. The point may be consumed by the user to play the game part. The amount of points consumed may differ for each game part. The points may increase, for example, over time or as a predetermined game content may be used.

The information related to the SNS may include various types of information associated with the SNS function. For example, the information related to the SNS may include information related to an avatar, buddy information, etc. for each user ID. The information related to the avatar may include clothing information for changing clothes. The buddy information may represent a user ID or a group ID connected via the SNS function. The buddy information may be the same as or different from the friend information in the game.

The game processing unit 31 may perform various types of processes related to the game. Various processes related to the game include a process of starting the game play and progressing the game based on operation information from the terminal apparatus 20. Note that the process of progressing the game may include a process of generating a game screen or a process of updating various parameters.

In addition, the game processing unit 31 may cause a normal event to be generated regularly or irregularly. The normal event may be an event in which all users can participate, unlike a specific event described later. The normal event may be generated (held) four times a month, for example. A form of the normal event may be arbitrary, and may be, for example, a game content acquisition event, a virtual space search event, a competition event with an opponent (for example, another user, an enemy character, an enemy building, etc.), etc.

In addition, the game processing unit 31 may execute a process related to a specific event generated by the specific event generation unit 40. The game processing unit 31 permits only a specific user, which may be described later, to participate in the specific event. For example, when the specific event is a game part including a bonus stage where a special card or item can be acquired, the game processing unit 31 may start the game part and progresses the game based on operation information from the terminal apparatus 20 related to the specific user.

The billing processing unit 32 may execute a process related to a billing service. In the present embodiment, as an example, the coin(s) A can be used at the site A. In this case, upon receiving a request for provision (purchase) of the coin(s) A from the user, the billing processing unit 32 may provide the user with the coin(s) A under a predetermined condition. Note that the billing processing unit 32 may provide the user with the coin(s) A on the condition that payment is made at that time instead of later payment, or provide the user with the coin(s) A by later payment.

In addition, upon receiving a demand for consumption of the coin(s) A from the user, the billing processing unit 32 may implement consumption of the coin(s) A. Note that as described above, the user may consume the coin(s) A when acquiring the desired first game content, acquiring the desired item, or turning the gacha.

The log information accumulation unit 34 collects log information of each user using the site A, and may accumulate the log information in the log information database 52 for each user ID. The log information to be accumulated may be all log information or specific log information (for example, log information related to an operation log or log information used by the index value calculation unit 37 described later). The log information may represent various activities on the site A based on each user ID (login, logout, use of digital content, access to/use of the SNS function, billing, etc.). In the present embodiment, the log information to be accumulated may include log information related to the game play.

FIG. 6 illustrates an example of the log information accumulated in the log information database 52. In FIG. 6, for each user ID (U01, U02, etc.), information indicating the operation date and time and information indicating the operation content may be accumulated as a set. Note that one set related to such log information may be generated for each operation. The log information accumulated in the log information database 52 may be raw data or processed data. Note that in the present embodiment, the log information to be accumulated may include log information related to the game play, as described above. In the case of the log information related to the game play, the information indicating the operation date and time and the information indicating the operation content may include information related to the date and time of the game play, the number of times that gameplay is engaged in, etc.

The log information retrieval unit 36 may retrieve (extract) log information related to a determination target user from the log information database 52. The determination target user may be all users in the user information database 50, or may be some users, and in the case of some users, some users may be appropriately determined. Note that the log information may be accumulated in the log information database 52 in a manner associated with the user ID, as described above. Note that the log information retrieval unit 36 may extract all the log information associated with the user ID, or may extract a part (for example, only log information in a specific period).

The index value calculation unit 37 may execute an index value calculation process of calculating an index value indicating a possibility that the determination target user may not execute the predetermined action within the predetermined period. Note that the index value calculation process may be performed regularly or irregularly. For example, the index value calculation process may be executed every day or may be executed every longer period. The predetermined period may be arbitrary, and may be preferably between two weeks and six weeks, for example, one month. The predetermined action may be an arbitrary action such as an action associated with the site A. For example, the predetermined action may be to log in to the site A, open a specific page in the site A, purchase the coin(s) A, consume the coin(s) A, activate a game application, play a game, participate in a predetermined event in the game, or take an action (for example, an action of acquiring a predetermined item or clearing a predetermined mission) during the game play.

In the present embodiment, as an example, it may be presumed that the predetermined action may be an action related to participation in the game. The action related to participation in the game may be activation of the game, play of the game, etc.

The index value calculation unit 37 may calculate, for each user, a probability (hereinafter, also referred to as a "leaving probability") that the determination target user does not perform the predetermined action within the predetermined period based on the log information related to the determination target user. More specifically, the leaving probability may represent a possibility that the predetermined action, which has continued with a predetermined frequency by the determination target user, may not continue with the predetermined frequency. The predetermined frequency may be, for example, M times or more a month, and in this case, for example, M times may be once or twice or more.

In the present embodiment, the index value calculation unit 37 may calculate the leaving probability based on the log information related to the predetermined action. The log information related to the predetermined action may indicate, for example, whether or not the predetermined action is performed. However, in the modification, in addition to the log information relating to the predetermined action, it may be possible to use log information associated with the predetermined action or other log information (for example, log information related to another game).

Here, there may be a relatively high correlation between the log information related to the predetermined action and the leaving probability. Therefore, by using this correlation, the leaving probability can be calculated based on the log information related to the predetermined action. Note that in this case, it may be possible to use artificial intelligence to input log information and output (calculate) the leaving probability. Artificial intelligence can be realized by implementing a convolutional neural network obtained by machine learning. In the machine learning, for example, a weight of the convolutional neural network, etc. that minimizes an error may be learned using actual data related to log information of a plurality of users. Note that the error mentioned here may include outputting a relatively low leaving probability based on log information before a predetermined period related to a user not executing a predetermined action within the predetermined period, and outputting a relatively high leaving probability based on log information before a predetermined period related to a user executing a predetermined action within the predetermined period.

In addition, in the present embodiment, the index value calculation unit 37 may calculate the leaving probability based on log information related to a specific event, which may be described later, in addition to log information related to a predetermined action. The log information related to the specific event may indicate, for example, whether or not the specific event may be participated in (or, equivalently, whether or not a predetermined privilege may be used). In addition, the log information related to the specific event may include information indicating content of a reward obtained in the specific event in addition to information indicating whether or not the specific event may be participated in. The specific event has an effect of promoting the user to take a predetermined action in the future, as described later. Therefore, it may be expected that a user participating in the specific event or a user receiving a considerable reward in the specific event may be likely to perform the predetermined action in the future. For this reason, the index value calculation unit 37 may calculate (correct) the leaving probability of the user participating in the specific event or the user obtaining the considerable reward in the specific event as (to) a lower leaving probability. However, this description may not be applied when participation in the specific event involves execution of a predetermined action at all times (for example, when the predetermined action may include an action of participating in an arbitrary event).

The index value calculation unit 37 may update index value data in the index value database 54 when the index value (leaving probability) may be calculated as described above. In an example illustrated in FIG. 7, various leaving probabilities may be stored for each user in the index value database 54. The various leaving probabilities may be leaving probabilities after N (N=1, . . . , 60) days (hereinafter, also simply referred to as "leaving probability $P_N$"). The leaving probability $P_N$ may represent a probability (leaving probability) of not executing a predetermined action within a predetermined period from the day N days after today. In this way, the index value calculation unit 37 may calculate the leaving probability $P_N$ for a plurality of N. In this case, since the leaving probability can be more finely calculated, effectiveness of the continuation promotion function can be enhanced.

The grouping unit 38 may perform a grouping process of grouping each user according to the leaving probability based on the leaving probability calculated by the index value calculation unit 37. In the present embodiment, as an example, it may be presumed that the grouping unit 38 groups a user group to be granted a predetermined privilege (or a predetermined privilege that produces the most advantageous effect) with a highest priority, which may be described later, into "group A", groups a user group to be granted the predetermined privilege with a second highest priority into "group B", and groups a user group less likely to be granted the predetermined privilege into "group X". In this case, it may be presumed that the priority order may be higher in the order of the groups A, B, and X.

In an example illustrated in FIG. 8, the user IDs "7" to "10" having the highest leaving probability after three days may be grouped into "group A". Note that a method of grouping may be arbitrary. For example, a user whose leaving probability $P_N$ exceeds a predetermined threshold value Th1 (for example, 80%) may be grouped into "group A", and other users may be grouped into "group X". In addition, the number of groups may be arbitrary and may be three or more. For example, a user whose leaving probability after 60 days exceeds a predetermined threshold value Th2 (for example, 70%) may be grouped into "group B". In this case, the grouping process may be executed such that one user belongs to two or more types of groups. Note that a user grouped to belong to two or more types of groups may be treated as belonging to a group having the highest priority.

The privilege granting unit 39 grants a predetermined privilege to a specific user based on the leaving probability calculated by the index value calculation unit 37. The predetermined privilege may be an arbitrary privilege that may be advantageous in the game. For example, the predetermined privilege may be a privilege that allows acquisition of a specific game content that can be used in the game, a privilege to easily acquire the specific game content, a privilege that allows participation in a specific event (described later), a privilege to easily participate in the specific event (a privilege to loosen a participation condition), etc. The specific game content may be, for example, a game content that can generate advantageous effect in the game, and may have a form of a game content, an item, etc. having a relatively high health point value or attack power, a form of a game content having a special skill, a form of a game content having relatively high rarity, etc. Therefore, when a specific game content can be obtained, it may become advantageous in the game to use the specific game content in the game when compared to the case where the specific game content may not be used.

In the present embodiment, as an example, the predetermined privilege may be a privilege to participate in the specific event. That is, the privilege granting unit 39 granting a specific privilege to one specific user substantially may correspond to the specific event generation unit 40 generating a specific event in which the specific user can participate.

In addition, the predetermined privilege may be an increase in the number and value of rewards that can be acquired at the specific event. For example, the predetermined privilege may be that the maximum number of rewards that can be acquired may be increased, even though difficulty of acquisition of rewards (strictness of acquisition condition) does not change.

Note that in the modification, the predetermined privilege may be a privilege that produces an advantageous effect in a specific event. The advantageous effect in the specific event may be determined according to an attribute of the specific event. For example, when the specific event may be an event in which a specific game content can be acquired, the advantageous effect in the specific event may be an effect in which the specific game content may be easily acquired. For example, when the specific game content is in a form of a reward obtained by clearing a quest, the advantageous effect may be an effect that makes it easier to clear the quest. Specifically, in this case, the predetermined privilege may be, for example, that an item necessary or useful for clearing the quest is granted, or that special skill or ability is granted. In addition, when the specific event may be an event in which a special gacha can be turned, the advantageous effect in the specific event may be an effect that a value of the special game content discharged by the special gacha increases, an effect that a probability that the special game content may be discharged by the special gacha increases, etc.

In addition, in another modification, the predetermined privilege may be a privilege irrelevant to play or gacha in the game, billing, etc. In this case, for example, the predetermined privilege may have a form of a login bonus, a form of a daily bonus, etc. The login bonus refers to a reward given when the user logs in every predetermined period (one day). For example, the login bonus may be granting a specific game content usable in the game, granting the coin(s) A, etc. The daily bonus may be a reward that can be obtained once or a predetermined number of times every day or every predetermined number of days (two or more days). Note that in the case of the daily bonus, unlike the login bonus, the reward may be given not when the user logs in but when the user arbitrarily may perform an acquisition operation. The reward related to the daily bonus may be a specific game content usable in the game, the coin(s) A, etc. as in the case of the login bonus. Granting the coin(s) A allows acquisition of the specific game content usable in the game by consumption of the coin(s) A, and thus may be an indirectly "advantageous privilege in the game". Note that when the predetermined privilege is unrelated to the specific event, the specific event generation unit 40 described later may be omitted. Note that, in still another modification, such various privileges may be selectively used as the predetermined privilege as appropriate.

Note that the predetermined privilege may have an expiration date (usage restriction) or may not have an expiration date (usage restriction). For example, the predetermined privilege may be a specific event to be described later, which may be effective only for latest one specific event, or effective for any specific event thereafter. Note that the predetermined privilege may typically be a privilege that disappears when used once (that is, a privilege that allows participation in one specific event). However, the predetermined privilege may be a privilege that allows participation in a plurality of specific events.

The privilege granting unit 39 may determine a specific user from respective users based on the leaving probability of each user calculated by the index value calculation unit 37. In this instance, the privilege granting unit 39 may determine the specific user from the respective users based on the leaving probability of each user in such a manner that a user having a higher leaving probability may be more likely to be determined as the specific user. For example, the privilege granting unit 39 may determine a user having a leaving probability of a predetermined threshold value Th3 or more as the specific user. The predetermined threshold value Th3 may be a constant value or a variable value. Further, the predetermined threshold value Th3 may be different depending on "N" related to the leaving probability $P_N$. The predetermined threshold value Th3 for a leaving probability $P_{365}$ after one year and the predetermined threshold value Th3 for a leaving probability $P_{30}$ after 30 days may be different from a viewpoint of effectively suppressing leaving. Alternatively, the privilege granting unit 39 may determine a predetermined number of users in descending order of the leaving probability as the specific user.

In addition, the privilege granting unit 39 may determine the specific user based on the groups grouped by the grouping unit 38. In this case, the privilege granting unit 39 may determine a user belonging to the "group A" as the specific user. Alternatively, the privilege granting unit 39 may determine users belonging to the "group A" and the "group B" as the specific user. In this case, the privilege granting unit 39 may grant the user belonging to the "group A" (an example of a predetermined user) a predetermined privilege more advantageous than that of the user belonging to the "group B" (an example of the other user).

The specific event generation unit 40 periodically or irregularly may generate the specific event. In the present embodiment, the specific event may be an event in which only a specific user granted a predetermined privilege can participate. The specific event may preferably be a private type in which only a specific user may be notified (notification by the notification unit 41 described later). In this case, consideration can be given to a user (user other than the specific user) not granted the predetermined privilege. Note that, in the modification, the specific event may be an event in which some users other than the specific user (however, not all the users but users who satisfy the participation condition, for example) can participate.

When the specific event is generated, the corresponding specific user can participate in the specific event. The specific event may be an arbitrary attribute such as a game part (event) having a bonus stage in which a special card or item can be acquired, an event in which a special gacha can be turned, etc.

For example, the specific event generation unit 40 may generate a participation button (not illustrated) related to the specific event on the game screen associated with the specific user. In this case, the participation button may be output before the specific event may be generated. In this case, the participation button may become active only during a generation period of the specific event (that is, during a holding period) and can be operated by the user. When the participation button is operated, participation in the specific event may be started.

In the present embodiment, as an example, the specific event may be a game part including a bonus stage in which a reward (specific game content) can be acquired, and there may be a plurality of types depending on the difference in reward. Specifically, there may be a plurality of types of specific events depending on the difference in reward, such as an event including a bonus stage A in which a considerably great reward can be obtained, an event including a bonus stage B in which a great reward can be obtained, and an event including a bonus stage C in which a normal reward (however, a reward better than that obtained in a normal event) can be obtained.

Here, in this specification, whether the reward is good or bad may depend on the attribute of the reward. For example, in the case where the reward is an amount of coins A, the larger the amount of coins, the better the reward. Further, in the case where the reward may be a specific game content, the higher the value of the specific game content obtained, the better the reward when the number of specific game media obtained is the same, and the larger the number of specific game media obtained, the better the reward when the value of the specific game content obtained is the same.

In this case, the privilege granting unit 39 may determine (assign) a type of a specific event (predetermined privilege) that can be participated in for each specific user in such a manner that the specific user having a higher leaving probability may be more likely to participate in the bonus stage A. For example, a specific event in which the user belonging to the "group A" can participate may be an event including the bonus stage A, and a specific event in which the user belonging to the "group B" can participate may be an event including the bonus stage B. Note that in the modification, the maximum rewards obtained in the bonus stages A to C may be the same. However, reward acquisition probabilities may be different. That is, the acquisition probability may be highest in the bonus stage A and may decrease in the bonus stage B and further decrease in the bonus stage C. In this case, for example, a reward acquisition condition imposed on the user belonging to the "group A" may be set to be looser than a reward acquisition condition imposed on the user belonging to the "group B", and the reward acquisition condition imposed on the user belonging to the "group B" may be set to be looser than a reward acquisition condition imposed on the user belonging to the "group C". In this way, the user belonging to the "group A" more easily may acquire the specific game content than the user belonging to the "group B", and the user belonging to the "group B" more easily may acquire the specific game content than the user belonging to the "group C".

The specific event can be participated in at any time during a set holding period (for example, on the day or one day). When the holding period is set to be relatively long, it may be possible to effectively increase a participation rate by advance notice (notification). In this case, the holding period may be different for each specific user, a common holding period may be set for each group, or a common holding period may be set for all the specific users. In addition, the specific event may be generated in a mode accompanying the normal event, or may be generated independently of the normal event. In addition, a holding time may be set over a plurality of periods (that is, the specific event may be set as a set for a plurality of times).

The notification unit 41 may issue a notification (invitation notification) for invitation to a specific event only to a specific user. The notification may be realized by, for example, a push notification, a notification on the site A, a short message to a corresponding telephone number, a mail to a corresponding mail address, etc. Alternatively, the notification may be realized by an operator (person) calling the corresponding telephone number from a call center, etc., or calling an associated telephone number and playing an automatic voice.

Note that the notification unit 41 preferably may perform notification not using the site A (for example, a short message to the corresponding phone number described above) in addition to or in place of the notification at the site A. In this way, it may become easy to notify the specific user not logging in to the site A of the holding of the specific event.

The user information database 50 may store user information (see FIG. 4) as described above.

As described above, the log information database 52 may store log information (see FIG. 6) for each user. The log information in the log information database 52 may be updated at any time as described above. Note that the log information in the log information database 52 may be discarded or transferred to another database after a relatively long period elapses from storing.

The index value database 54 may store each index value (calculation result) (see FIG. 7) as described above.

Information related to the specific event may be stored in the specific event database 56 as described above. In an example illustrated in FIG. 9, the information related to the specific event may include, for each specific event ID, a user ID (one or more user IDs) of the specific user invited to the specific event, reward content, and an end condition. The reward content may include not only content of the reward but also an acquisition condition of the reward. The end condition may correspond to the case where an end time of the holding time may be reached. Alternatively, the end condition may be satisfied for each specific user by the participation only for the participating specific user. Note that in the present embodiment, as an example, the specific event associated with each specific event ID may be held every day.

In the present embodiment, as an example, there may be three types of specific event IDs. A specific event ID "000A" may represent a specific event in which each specific user belonging to the group A can participate, a specific event ID "000B" may represent a specific event in which each specific user belonging to the group B can participate, and a specific event ID "000C" may represent a specific event in which each specific user belonging to the group C can participate.

As described above, according to the present embodiment, the leaving probability of each user may be calculated based on the log information of each user, the predetermined privilege may be granted to the specific user based on the leaving probability of each user, and only the user granted the predetermined privilege can participate in the specific event. In this instance, since a user having a relatively high leaving probability may be determined as the specific user, it may be possible to grant the predetermined privilege to the user having the relatively high leaving probability. By granting the predetermined privilege to the user having the relatively high leaving probability, it may be possible to give the user motivation to continue playing the game. That is, when the user feels attracted to the granted privilege, the user may enjoy a profit (reward obtained at a specific event) related to the privilege to feel enjoyment of playing the game again, and a possibility that the user may be motivated to continue playing the game may increase. In this way, the continuation promotion function according to the present embodiment can motivate a user having a relatively high leaving probability to continue playing the game.

Note that in the present embodiment, as described above, the predetermined privilege may be a privilege that allows participation in the specific event. However, even when the predetermined privilege may be another privilege as described above, the same effect as described above can be obtained.

In addition, according to the present embodiment, by selectively performing the above process only for a specific user (that is, a user having a relatively high leaving probability), it may be possible to give the user motivation to continue playing the game while reducing a processing load of the server apparatus 10 when compared to performing the same process for all users.

In addition, according to the present embodiment, as described above, the grouping unit 38 may perform a grouping process from a viewpoint of whether or not the predetermined privilege (or the predetermined privilege that produces the most advantageous effect) needs to be granted with the highest priority. Therefore, in the present embodiment, for example, a user group having a leaving probability $P_1$ of 50% after one day and a user group having a leaving probability $P_7$ of 90% after one week may be grouped into the same group since it may be considered that there may be groups that can be treated equally as a potential possibility of leaving even when the periods ("N" related to the leaving probability $P_N$) may be different. In this way, it may be possible to suppress an unnecessary increase in the number of groups and reduce the processing load. In particular, when the type of the predetermined privilege may be different for each group, the processing load (or design load) increases as the number of groups increases. However, according to the present embodiment, the load can be efficiently reduced. However, in the modification, the grouping unit 38 may perform the grouping process in a mode in which the same predetermined privilege can be granted to specific users belonging to different groups.

Note that in the present embodiment, as described above, when the specific user may be granted the predetermined privilege and enjoys the profit related to the predetermined privilege (that is, when the specific user participates in the specific event and obtains the reward), the index value calculation unit 37 may update the leaving probability related to the specific user with a relatively low value since when the specific user enjoys the profit related to the predetermined privilege, there may be a high possibility that a predetermined action may be executed within a predetermined period. In other words, the effect of the predetermined privilege (that is, the reward obtained at the specific event) may be preferably adapted so that the user again desires to perform the predetermined action within the predetermined period. Specifically, the reward obtained at the bonus stage A, B, C, etc. may preferably be available at the next and subsequent normal events and bring an advantageous effect during use. For example, the reward may be a specific game content such as a card or an item that brings an advantageous effect at the next or subsequent normal event, which effectively promotes participation in the next or subsequent normal event by the user receiving the reward at the bonus stage A, B, C, etc. Note that in the modification, the reward obtained at the bonus stage A, B, C, etc. may be available at any normal event. For example, when there is a normal event being held at the time, the reward obtained at the bonus stage A, B, C, etc. may be available at the normal event currently being held (this normal event) and bring an advantageous effect during use.

Here, in the present embodiment, as described above, the leaving probability may be calculated in a plurality of types as the leaving probability $P_N$. In this case, the leaving probability can be calculated more finely, and thus the effectiveness of the continuation promotion function can be enhanced. That is, by changing the predetermined privilege according to the leaving probability $P_N$, it may be possible to increase a possibility that an appropriate predetermined privilege can be granted only to a user having a relatively high need to grant the predetermined privilege without granting an excessive predetermined privilege to a user having a relatively low need to grant the predetermined privilege. In addition, it may be possible to suppress excessive inflation of parameters related to the user in the game, and maintain an appropriate game balance.

Figure 10A:
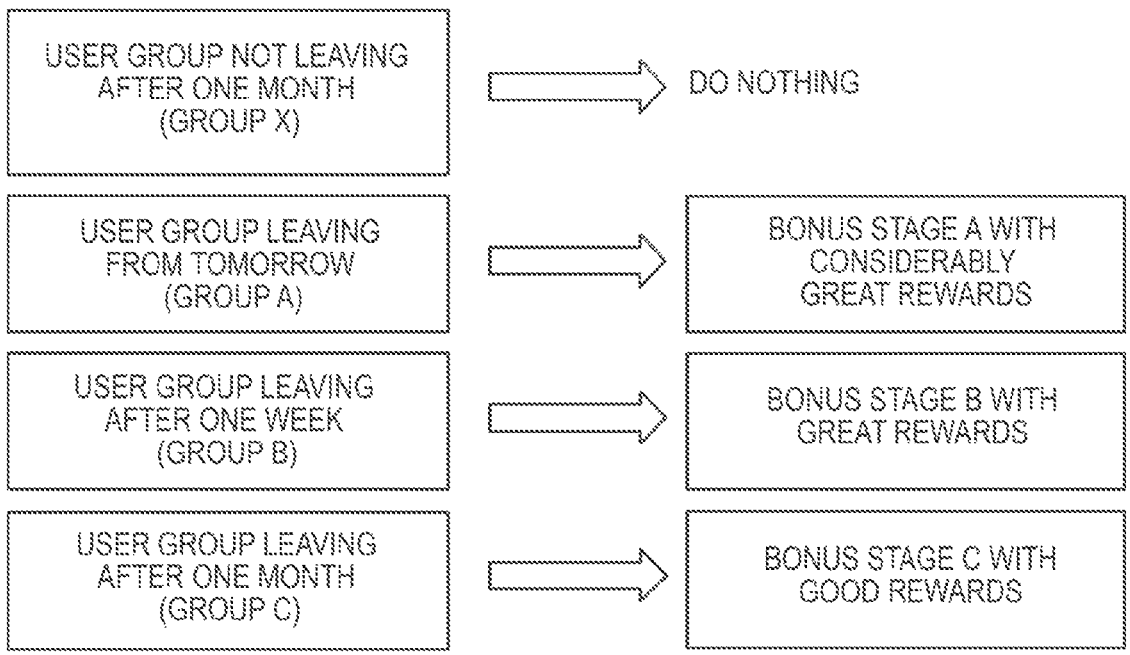
FIG. 10A is an explanatory diagram of a preferable example of an effect of a predetermined privilege.

For example, in an example illustrated in FIG. 10A, the grouping unit 38 may divide respective users into four groups A, B, C, and X. A user having a leaving probability $P_1$ after one day greater than or equal to a predetermined threshold value Th4 (for example, 95%) belongs to the group A as a "user group leaving from tomorrow", a user having a leaving probability $P_7$ after seven days (that is, leaving probability $P_7$ after one week) greater than or equal to a predetermined threshold value Th5 (for example, 95% or less than the predetermined threshold value Th4) belongs to the group B as a "user group leaving after one week", a user having a leaving probability $P_{30}$ or $P_{31}$ after 30 or 31 days (that is, leaving probability $P_{30}$ or $P_{31}$ after one month) greater than or equal to a predetermined threshold value Th6 (for example, 95% or less than the predetermined threshold value Th5) belongs to the group C as a "user group leaving after one month", and other users belong to the group X as a "user group not leaving after one month". In this case, the respective users belonging to the groups A, B, and C may be determined as the specific user, and the predetermined privilege may be granted. However, the predetermined privilege granted to the user belonging to the group A may be more advantageous than the predetermined privilege granted to the user belonging to the group B, and the predetermined privilege granted to the user belonging to the group B may be more advantageous than the predetermined privilege granted to the user belonging to the group C. In this way, even when the leaving probability may be the same, by gradually increasing the effect of the predetermined privilege as N of the leaving probability $P_N$ decreases (as urgency immediately increases), it may be possible to increase a possibility that an appropriate predetermined privilege can be granted only to a user having a relatively high need to grant the predetermined privilege without granting an excessive predetermined privilege to a user having a relatively low need to grant the predetermined privilege. In addition, it may be possible to suppress excessive inflation of parameters related to the user in the game, and maintain an appropriate game balance.

Figure 10B:
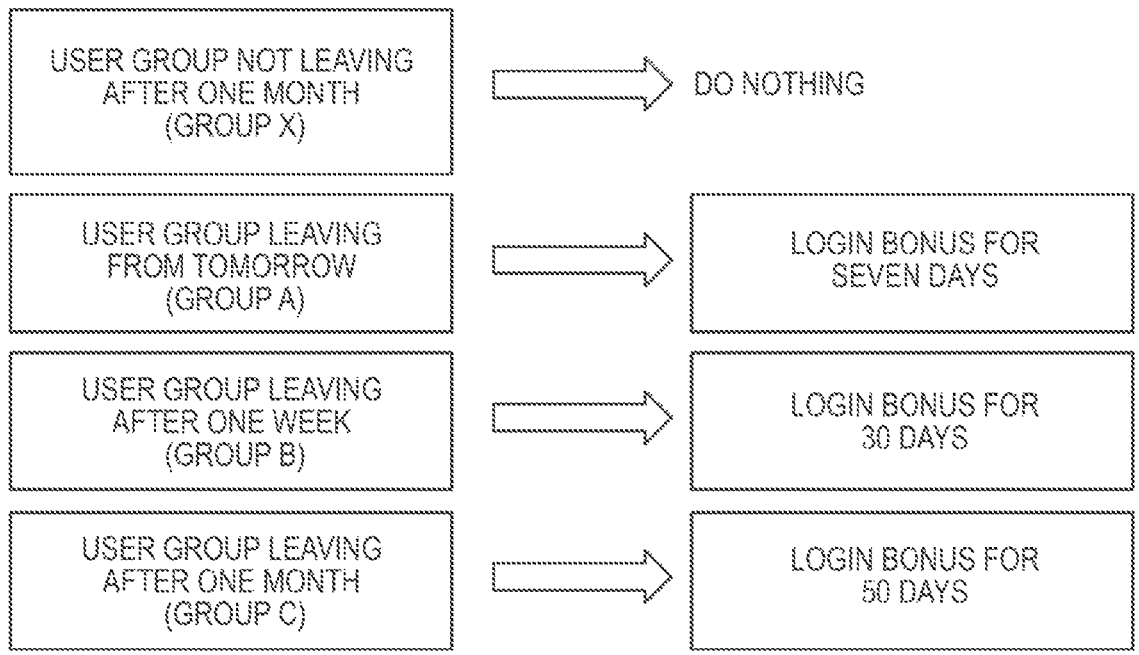
FIG. 10B is an explanatory diagram of another preferable example of the effect of the predetermined privilege.

Further, in an example illustrated in FIG. 10B, the grouping unit 38 may divide the respective users into four groups A, B, C, and X, as in the example illustrated in FIG. 10A. However, in the example illustrated in FIG. 10B, unlike the example illustrated in FIG. 10A, the predetermined privilege may be in the form of a login bonus. In this case, a login bonus granted to the user belonging to the group A may be valid for, for example, seven days, a login bonus granted to the user belonging to the group B may be valid for, for example, 30 days, and a login bonus granted to the user belonging to the group C may be valid for, for example, 50 days. Note that the login bonus may not be granted to the user belonging to the group X. By such an exemplary embodiment, it may be possible to give motivation to continue playing the game to specific users (users belonging to the groups A to C).

Next, a description may be given of an operation example associated with the continuation promotion processing by the server apparatus 10 with reference to FIG. 11 and subsequent figures. In the subsequent processing flow charts (flowcharts), a processing order of each step may be changed as long as a relationship between an input and an output of each step is not impaired.

FIG. 11 may be a schematic flowchart illustrating an example of a process associated with the continuation promotion process by the server apparatus 10.

In step S111, the index value calculation unit 37 of the server apparatus 10 may determine whether or not an update timing of the leaving probability may be reached. The update timing of the leaving probability may be arbitrary. Here, it may be presumed that the update timing may be a start time (0:00) of one day. When a determination result may be "YES", the operation proceeds to step S112. Otherwise, the operation proceeds to step S117.

In step S112, the log information retrieval unit 36 and the index value calculation unit 37 of the server apparatus 10 may cooperate with each other to execute a leaving probability calculation process related to each user in the user information database 50. An example of the leaving probability calculation process may be described later with reference to FIG. 12.

In step S113, the grouping unit 38 of the server apparatus 10 may execute a grouping process based on data in the index value database 54. An example of the grouping process may be described later with reference to FIG. 13.

In step S114, the privilege granting unit 39 of the server apparatus 10 may execute a privilege granting process of granting a predetermined privilege to a specific user based on a result of the grouping process of step S113. An example of the privilege granting process may be described later with reference to FIG. 14, and involves updating the data in the specific event database 56.

In step S115, the notification unit 41 of the server apparatus 10 may perform a notification process based on a result of the privilege granting process in step S114. Specifically, each specific user associated with the specific event ID "000A" may be notified of generation of the specific event associated with the specific event ID "000A", each specific user associated with the specific event ID "000B" may be notified of generation of the specific event associated with the specific event ID "000B", and so on. Note that a notification method may be as described above. Note that various notifications described above may be repeatedly executed as appropriate according to the attribute. For example, the notification on the site A may be executed when the specific user logs in to the site A, or may be executed at another timing, depending on the login status of the specific user. In addition, it may be possible to properly use a plurality of notification methods, such as performing notification by email when a specific user does not log in to the site A.

In step S116, the specific event generation unit 40 of the server apparatus 10 may generate a specific event related to each specific event ID ("000A", "000B", and "000C") in a mode in which only a corresponding specific user can participate (for example, a mode in which a participation button may be drawn on a terminal apparatus 20 related to only the corresponding specific user).

In step S117, the billing processing unit 32 of the server apparatus 10 may appropriately perform a billing process.

In step S118, the game processing unit 31 of the server apparatus 10 may perform various game processes. In this instance, the game processing unit 31 may perform, for a specific user participating in the specific event, a game process related to the specific event based on operation information from the terminal apparatus 20 related to the specific user. Based on the data in the specific event database 56, the game processing unit 31 may process a request for participation in the specific event so that the participation in the specific event by one specific user may be permitted a predetermined number of times Np. For example, when the request for participation in the specific event related to the specific event ID "000A" is received, it may be checked whether or not the user ID making the participation request may be associated with the specific event ID "000A". When the user ID is associated, participation may be permitted up to a predetermined number of times Np. The predetermined number of times Np may be 1 or more and may be a fixed value or change depending on the attribute of the specific event.

In step S119, the user registration unit 30 of the server apparatus 10 may appropriately perform a user registration process.

In step S120, the log information accumulation unit 34 of the server apparatus 10 may accumulate latest log information in the log information database 52.

Figure 12:
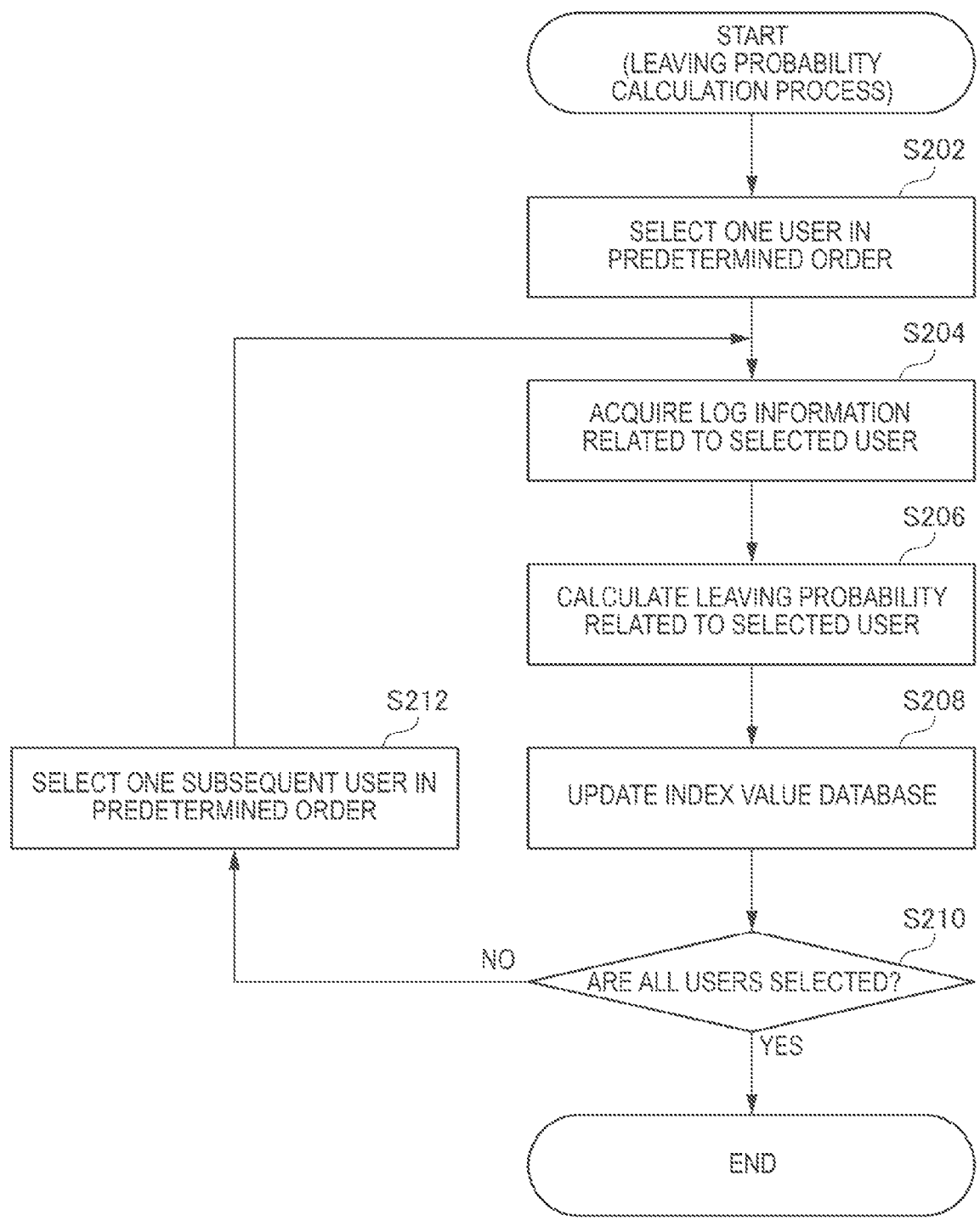
FIG. 12 is a schematic flowchart illustrating an example of a leaving probability calculation process (step S112 of FIG. 11)

FIG. 12 may be a schematic flowchart illustrating an example of the leaving probability calculation process (step S112 of FIG. 11).

In step S202, the log information retrieval unit 36 may select one user in a predetermined order from respective users in the user information database 50.

In step S204, the log information retrieval unit 36 may extract (retrieve) log information related to the user selected in step S202 from the log information database 52.

In step S206, the index value calculation unit 37 may calculate an index value related to the selected user, that is, the leaving probability, based on the log information extracted in step S204. Note that the leaving probability may be calculated for a plurality of Ns as the leaving probability $P_N$ as described above.

In step S208, the index value calculation unit 37 may store (update) the leaving probability $P_N$ calculated in step S206 (leaving probability $P_N$ related to the selected user) in the index value database 54.

In step S210, it may be determined whether or not all the users in the user information database 50 are selected. When a determination result is "YES", the operation may end, and otherwise, processing from step S204 may be repeated through step S212.

In step S212, the log information retrieval unit 36 may select next one user (new one user) from the respective users in the user information database 50 in a predetermined order.

Figure 13:
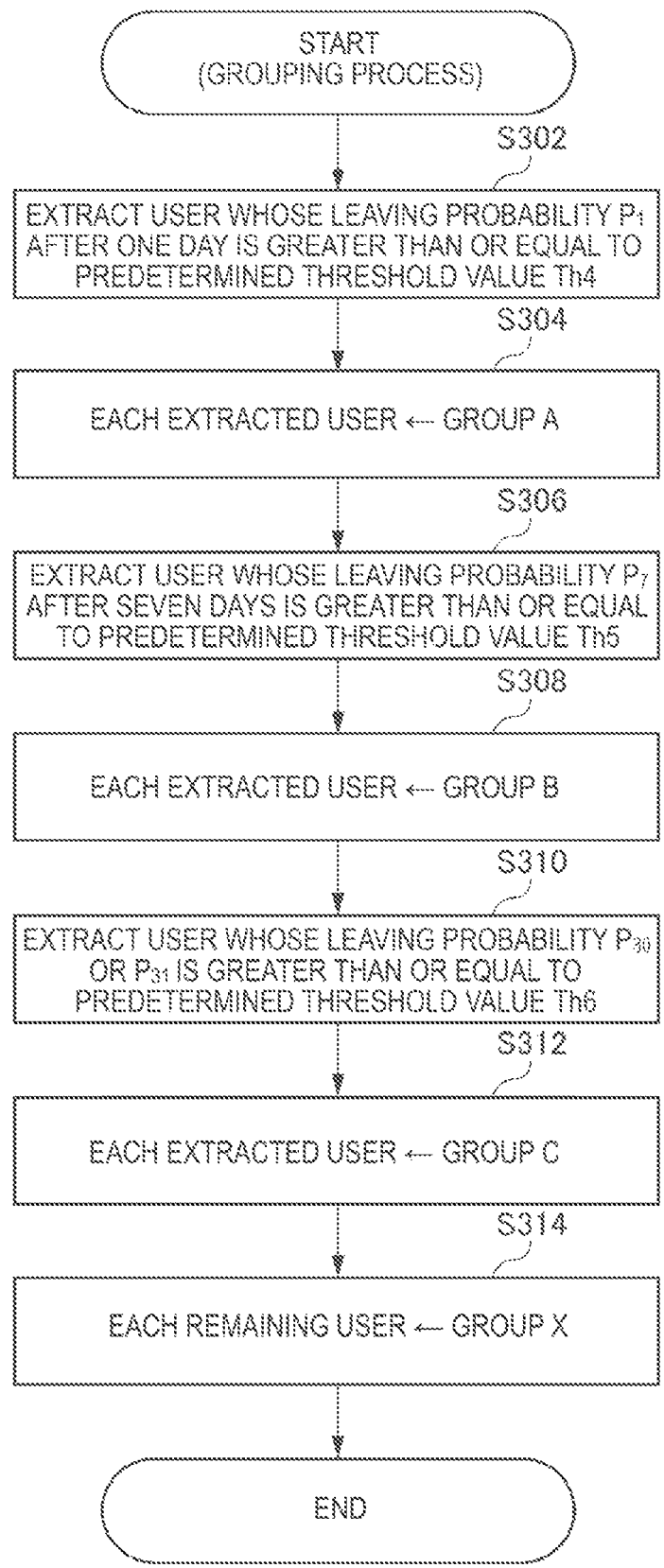
FIG. 13 is a schematic flowchart illustrating an example of a grouping process (step S113 of FIG. 11)

FIG. 13 may be a schematic flowchart illustrating an example of the grouping process (step S113 of FIG. 11).

In step S302, the grouping unit 38 may extract, from the respective users in the user information database 50, a user having the leaving probability $P_1$ after one day greater than or equal to the predetermined threshold value Th4 (for example, 95%).

In step S304, the grouping unit 38 groups each user extracted in step S302 into the group A as a "user group leaving from tomorrow".

In step S306, the grouping unit 38 may extract a user whose leaving probability $P_7$ after seven days may be greater than or equal to the predetermined threshold value Thy (for example, 95% or less than the predetermined threshold value Th4) from respective users excluding the user grouped into the group A among the respective users in the user information database 50.

In step S308, the grouping unit 38 groups each user extracted in step S306 into the group B as a "user group leaving in one week".

In step S310, the grouping unit 38 may extract a user whose leaving probability $P_{30}$ or $P_{31}$ after 30 or 31 days (that is, leaving probability $P_{30}$ or $P_{31}$ after one month) may be greater than or equal to the predetermined threshold value Th6 (for example, 95% or less than the predetermined threshold value Thy) from respective users excluding the user grouped into the group A or the group B among the respective users in the user information database 50.

In step S312, the grouping unit 38 may group each user extracted in step S310 into the group C as a "user group leaving in one month".

In step S314, the grouping unit 38 may group respective remaining users among the respective users in the user information database 50 into the group X. Note that step S314 may be omitted.

Figure 14:
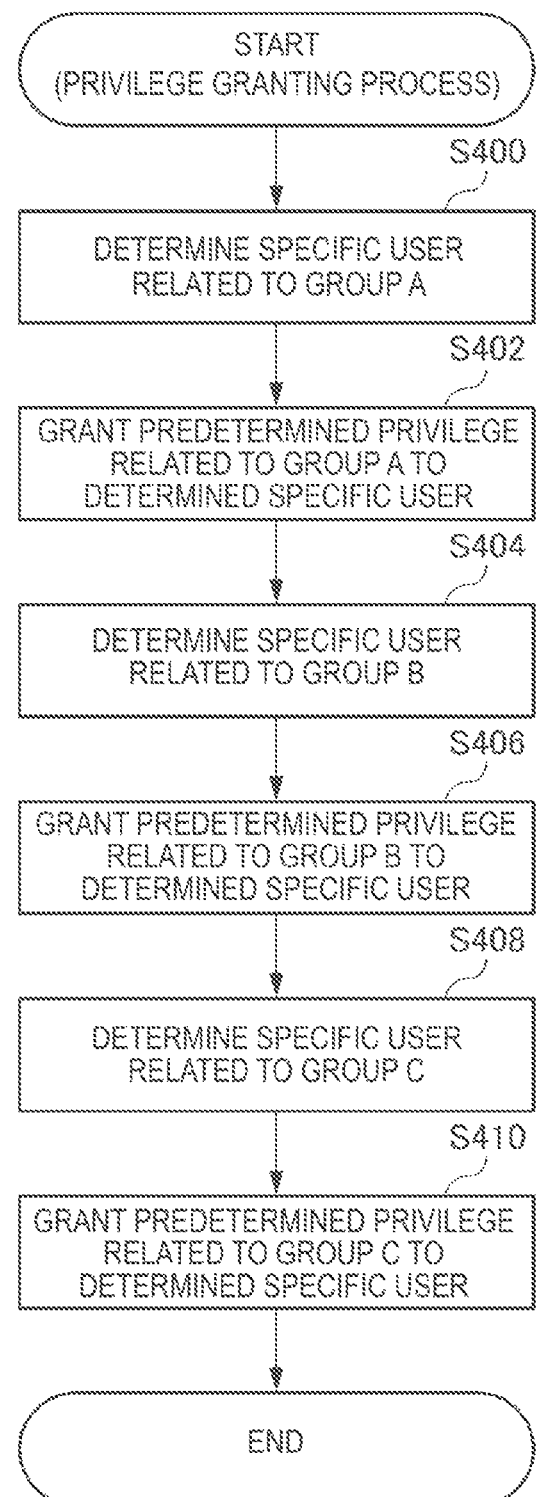
FIG. 14 is a schematic flowchart illustrating an example of a privilege granting process (step S114 of FIG. 11).

FIG. 14 may be a schematic flowchart illustrating an example of the privilege granting process (step S114 of FIG. 11).

In step S400, the privilege granting unit 39 may determine each user belonging to the group A as the specific user belonging to the group A.

In step S402, the privilege granting unit 39 may grant the predetermined privilege related to the group A to the specific user related to the group A. Specifically, in the specific event database 56, the privilege granting unit 39 associates the specific event ID "000A" with each user ID of the specific user related to the group A. In this way, the specific user related to the group A can participate in the specific event related to the specific event ID "000A" (specific event related to the specific event ID "000A" generated in step S116).

In step S404, the privilege granting unit 39 may determine each user belonging to the group B as a specific user related to the group B.

In step S406, the privilege granting unit 39 may grant a predetermined privilege related to the group B to the specific user related to the group B. Specifically, in the specific event database 56, the privilege granting unit 39 may associate the specific event ID "000B" with each user ID of the specific user related to the group B. In this way, the specific user related to the group B can participate in the specific event related to the specific event ID "000B" (specific event related to the specific event ID "000B" generated in step S116).

In step S408, the privilege granting unit 39 may determine each user belonging to the group C as a specific user related to the group C.

In step S410, the privilege granting unit 39 may grant a predetermined privilege related to the group C to the specific user related to the group C. Specifically, in the specific event database 56, the privilege granting unit 39 may associate the specific event ID "000C" with each user ID of the specific user related to the group C. In this way, the specific user related to the group C can participate in the specific event related to the specific event ID "000C" (specific event related to the specific event ID "000C" generated in step S116).

In this way, according to processing illustrated in FIGS. 11 to 14, the leaving probability $P_N$ may be calculated (updated) every predetermined time (in this example, every day), and thus it may be possible to reflect log information related to a status of participation of each specific user in the specific event in a calculation result of the leaving probability $P_N$ every predetermined time. In this way, accuracy of the calculation result of the leaving probability $P_N$ can be increased, and effectiveness of the above-described continuation promotion process can be increased.

Note that in processing illustrated in FIGS. 11 to 14, since the leaving probability $P_N$ related to the specific user participating in the specific event related to the specific event ID "000B" or the specific event ID "000C" may be decreased due to the participation, it may be unlikely that the user can participate in a plurality of types of specific events. That is, the specific user participating in the specific event ID "000C" may be inhibited from participating in the specific events related to the specific event ID "000A" and the specific event ID "000B", and the specific user participating in the specific event ID "000B" may be inhibited from participating in the specific event related to the specific event ID "000A".

In this regard, when a reward obtained by participating in the specific event related to the specific event ID "000B" or the specific event ID "000C" once is significantly lower than a reward obtained by participating in the specific event related to the specific event ID "000A" once, there may be a risk of an unfair feeling.

Therefore, to prevent such an unfair feeling, the predetermined privilege may be a privilege that allows participation in the specific event related to the specific event ID "000B" or the specific event ID "000C" for a plurality of consecutive days. For example, the predetermined privilege granted to the specific user belonging to the group B may be a privilege that allows participation in the specific event related to the specific event ID "000B" for seven consecutive days. In this case, a total reward obtained by participating in the specific event related to the specific event ID "000B" every day for 7 days may be significantly superior (for example, the number or a value of specific game media obtained as a reward may increase) to a reward obtained by participating in the specific event related to the specific event ID "000A" once. In this way, it may be possible to eliminate an unfair feeling due to the fact that the reward may be superior in the case where the specific user belonging to the group A participates in the specific event related to the specific event ID "000A" for one day than in the case where the specific user belonging to the group B participates in the specific event related to the specific event ID "000B" every day. That is, it may be possible to promote early participation in a specific event and enhance the effectiveness of the continuation promotion process described above. However, in the modification, the overall reward obtained by participating in the specific event every day for 7 days may be the same as or significantly inferior than the reward obtained by participating in the specific event related to the specific event ID "000A" once.

Similarly, the predetermined privilege granted to the specific user belonging to the group C may be a privilege that allows participation in the specific event related to the specific event ID "000C" for 30 or 31 consecutive days. In this case, a total reward obtained by participating in the specific event related to the specific event ID "000C" for 30 days or 31 days every day may be significantly superior to the reward obtained by participating in the specific event related to the specific event ID "000A" once and the reward obtained by participating in the specific event related to the specific event ID "000B" seven times. In this way, it may be possible to eliminate an unfair feeling due to the fact that the reward may be superior in the case where the specific user belonging to the group A participates in the specific event related to the specific event ID "000A" for one day or the case where the specific user belonging to the group B participates in the specific event related to the specific event ID "000B" every day than in the case where the specific user belonging to the group C participates in the specific event related to the specific event ID "000C" every day. That is, it may be possible to promote early participation in a specific event and enhance the effectiveness of the continuation promotion process described above. However, in the modification, the total reward obtained by participating in the specific event for 30 days or 31 days every day may be the same as or significantly inferior than the reward obtained by participating in the specific event related to the specific event ID "000A" once or the reward obtained by participating in the specific event related to the specific event ID "000B" seven times.

Further, in order to promote early participation in the specific event, the leaving probability $P_N$ related to the specific user participating in the specific event related to the specific event ID "000B" or the specific event ID "000C" may be reduced due to the participation. However, the amount of decrease may be relatively small. For example, the amount of decrease in the leaving probability $P_N$ due to participation in the specific event related to the specific event ID "000C" may be set to be significantly smaller than the amount of decrease in the leaving probability $P_N$ due to participation in the specific event related to the specific event ID "000B", and the amount of decrease in the leaving probability $P_N$ due to participation in the specific event related to the specific event ID "000B" may be set to be significantly smaller than the amount of decrease in the leaving probability $P_N$ due to participation in the specific event related to the specific event ID "000A". In this case, even by participating in an earlier specific event, there remains a possibility of being able to participate in the subsequent specific event, and it may be possible to reduce the unfair feeling as described above.

Note that even though the grouping process may be executed in processing illustrated in FIGS. 11 to 14, the grouping process may be omitted. In this case, the privilege granting unit 39 may determine a user whose leaving probability $P_1$ after one day may be greater than or equal to the predetermined threshold value Th4 (for example, 95%) as a first specific user, and may associate a user ID related to the first specific user with the specific event ID "000A" in the specific event database 56. Similarly, the privilege granting unit 39 may determine a user whose leaving probability $P_7$ after seven days may be greater than or equal to the predetermined threshold value Thy (for example, 95% or less than the predetermined threshold value Th4) as second specific user, and may associate a user ID related to the second specific user with the specific event ID "000B" in the specific event database 56. Similarly, the privilege granting unit 39 may determine a user whose leaving probability $P_{30}$ or $P_{31}$ after 30 or 31 days (that is, leaving probability $P_{30}$ or $P_{31}$ after one month) may be greater than or equal to the predetermined threshold value Th6 (for example, 95% or less than the predetermined threshold value Thy) as a third specific user, and may associate a user ID related to the third specific user with the specific event ID "000C" in the specific event database 56.

Even though the respective embodiments have been described in detail above, the invention is not limited to a specific embodiment, and various modifications and changes can be made within the scope of the claims. In addition, it may be possible to combine all or a plurality of the constituent elements of the above-described embodiments.

For example, in the above-described embodiments, the grouping unit 38 may perform the grouping process based on the leaving probability calculated by the index value calculation unit 37 and other information such as information related to SNS. For example, the grouping process may be performed based on the information related to the SNS so that a certain user and a user closely connected to the user do not belong to another group. In this case, it may become easy to maintain the confidentiality of the specific event. However, in this case, the predetermined privilege granted to a user having a low leaving probability among respective users belonging to the same group may not produce a more advantageous effect than that of other users.

Further, in the embodiments, the privilege granting unit 39 may grant the predetermined privilege to the specific user based on other parameters in addition to the leaving probability calculated by the index value calculation unit 37. In this case, a determination mode of the specific user may be changed based on other parameters, and/or the predetermined privilege may be changed based on other parameters. In this case, such other parameters may be: a change tendency of the leaving probability (for example, an increasing tendency or a decreasing tendency), a billing amount, a possessed coin value, the number of participations in a specific event (the number of past participations), etc. From the same viewpoint, the grouping unit 38 may perform grouping based on other parameters in addition to the leaving probability calculated by the index value calculation unit 37. In this case, other parameters may be a change tendency of the leaving probability (for example, an increasing tendency or a decreasing tendency), a billing amount, a possessed coin value, the number of participations in a specific event (the number of past participations), etc.

Further, in the embodiments, at least a part of a screen displayed on the terminal apparatus 20 may be set to a web display displayed on the terminal apparatus 20 based on data generated by the server apparatus 10, and at least a part of a screen may be set to a native display displayed by a native application installed in the terminal apparatus 20. As described above, the game according to the embodiments may be a hybrid game in which each of the server apparatus 10 and the terminal apparatus 20 may perform a part of processing. In this case, the predetermined action may not be an action associated with the site A, and may be, for example, an action related to the native application in the terminal apparatus 20 (for example, a predetermined operation). In this case, the index value calculation unit 37 may calculate the leaving probability based on log information related to the native application. Further, in this case, some or all of functions of the index value calculation unit 37 may be implemented by the terminal apparatus 20. For example, execution of the predetermined operation may be retrieved on the terminal apparatus 20, and information indicating that the predetermined operation has been executed may be transmitted to the server apparatus 10 and recorded in the log information database 52 as log information by the server apparatus 10.

Note that the following appendices will be disclosed with regard to the embodiments.

Appendix 1

A game apparatus including
a log information retrieval unit that retrieves log information associated with user identification information related to a plurality of registered users,
a game processing unit that starts playing a game and progresses the game based on operation information by the registered users,
an index value calculation unit that calculates, for each of the registered users, an index value indicating a possibility that the registered users will not perform a predetermined action within a predetermined period based on the log information retrieved by the log information retrieval unit, and
a privilege granting unit that grants a predetermined privilege, which is advantageous in the game, to a specific user of the plurality of registered users based on the index value calculated by the index value calculation unit for each of the registered users.

Appendix 2

The game apparatus according to appendix 1, in which the predetermined action includes at least one of an action related to participation in the game, an action during play of the game, and consumption of a predetermined game content associated with the game.

Appendix 3

The game apparatus according to appendix 1 or 2, further including
a specific event generation unit that regularly or irregularly generates a specific event in which a limited number of registered users of the plurality of registered users are allowed to participate,
in which the predetermined privilege includes at least one of a privilege that allows participation in the specific event, a privilege that facilitates participation in the specific event, and a privilege that produces an advantageous effect in the specific event.

Appendix 4

The game apparatus according to appendix 3,
in which the specific event is an event in which a specific game content available during playing the game is allowed to be acquired unconditionally in response to participation or when a predetermined acquisition condition is satisfied by participating, and
the privilege granting unit relaxes the predetermined acquisition condition as a privilege to produce an advantageous effect in the specific event.

Appendix 5

The game apparatus according to appendix 4,
in which the game processing unit regularly or irregularly generates an event different from the specific event, the plurality of registered users being allowed to participate in the event, and
the specific game content is available in the event this time or a subsequent time and brings an advantageous effect during use.

Appendix 6

The game apparatus according to any one of appendices 1 to 5, in which the privilege granting unit determines, from the plurality of registered users, a registered user whose possibility is greater than or equal to a predetermined threshold value as the specific user.

Appendix 7

The game apparatus according to any one of appendices 1 to 5, further including
a grouping unit that divides the plurality of registered users into a plurality of groups according to the possibility,
in which the privilege granting unit determines registered users belonging to a first group having a relatively high possibility as specific users, and grants a predetermined privilege to a predetermined user among the determined specific users, the predetermined privilege being more advantageous than a privilege of another user.

Appendix 8

The game apparatus according to any one of appendices 1 to 7, in which the index value represents a possibility that the predetermined action, which has continued with a predetermined frequency by the registered users, will not continue with the predetermined frequency.

Appendix 9

The game apparatus according to any one of appendices 1 to 8, in which the index value calculation unit calculates the index value representing the possibility at each of a plurality of time points after a current time point.

Appendix 10

A game method executed by a computer, the method including
retrieving log information associated with user identification information related to a plurality of registered users,
starting playing a game and progressing the game based on operation information by the registered users,
calculating, for each of the registered users, an index value indicating a possibility that the registered users will not perform a predetermined action within a predetermined period based on the log information, and
granting a predetermined privilege, which is advantageous in the game, to a specific user of the plurality of registered users based on the calculated index value for each of the registered users.

Appendix 11

A game program causing a computer to execute processes of
retrieving log information associated with user identification information related to a plurality of registered users,
starting playing a game and progressing the game based on operation information by the registered users,
calculating, for each of the registered users, an index value indicating a possibility that the registered users will not perform a predetermined action within a predetermined period based on the log information, and
granting a predetermined privilege, which is advantageous in the game, to a specific user of the plurality of registered users based on the calculated index value for each of the registered users.

REFERENCE SIGNS LIST 1 game system
3 network
10 server apparatus
11 server communication unit
12 server storage unit
13 server control unit
20 terminal apparatus
21 terminal communication unit
22 terminal storage unit
23 display unit
24 input unit
25 terminal control unit
30 user registration unit
31 game processing unit
32 billing processing unit
34 log information accumulation unit
36 log information retrieval unit
37 index value calculation unit
38 grouping unit
39 privilege granting unit
40 specific event generation unit
41 notification unit
50 user information database
52 log information database
54 index value database
56 specific event database

The invention claimed is:
1. A game apparatus comprising:
a log information retrieval unit configured to retrieve log information associated with user identification information related to a plurality of registered users, said log information comprising a plurality of gameplay actions executed within a game by each of the registered users and timestamp information associated with each of the plurality of gameplay actions;
a game processing unit configured to start playing the game and configured to progress the game based on operation information by the registered users;
an index value calculation unit configured to calculate, for each of the registered users, an index value indicating a possibility that the registered users will not perform a predetermined action within a predetermined period based on the log information retrieved by the log information retrieval unit; and
a privilege granting unit configured to grant a predetermined privilege, said predetermined privilege being advantageous in the game, to a specific user of the plurality of registered users based on the index value calculated by the index value calculation unit for each of the registered users, wherein granting the predetermined privilege comprises accessing a gameplay database, associating, with the specific user of the plurality of registered users, in the gameplay database, the predetermined privilege, and providing at least one effect within the game based on the predetermined privilege.
2. The game apparatus according to claim 1, wherein the predetermined action includes at least one of an action related to participation in the game, an action during play of the game, and consumption of a predetermined game content associated with the game.

3. The game apparatus according to claim 1, further comprising:
- a specific event generation unit configured to regularly or irregularly generate a specific event, said specific event having an access restriction to a limited number of registered users of the plurality of registered users,
- wherein the predetermined privilege includes at least one of a privilege configured to enable participation in the specific event, a privilege configured to facilitate participation in the specific event, and a privilege configured to produce an advantageous effect in the specific event.

4. The game apparatus according to claim 3, wherein the specific event is an event in which a specific game content available during playing the game is one of: provided unconditionally in response to participation or provided upon satisfaction of a predetermined acquisition condition by participating, and
- the privilege granting unit is configured to relax the predetermined acquisition condition as a privilege to produce an advantageous effect in the specific event.

5. The game apparatus according to claim 4, wherein the game processing unit is configured to regularly or irregularly generate an event different from the specific event, and is configured to enable participation in the event from the plurality of registered users, and
- the specific game content is available in the event during at least one of this time or a subsequent time, said specific game content configured to provide an advantageous effect during use.

6. The game apparatus according to claim 1, wherein the privilege granting unit is configured to determine, from the plurality of registered users, a registered user whose possibility is greater than or equal to a predetermined threshold value as the specific user.

7. The game apparatus according to claim 1, further comprising:
- a grouping unit configured to divide the plurality of registered users into a plurality of groups according to the possibility,
- wherein the privilege granting unit is configured to determine registered users belonging to a first group having a relatively high possibility as specific users, and is configured to grant a predetermined privilege to a predetermined user among the determined specific users, the predetermined privilege being more advantageous than a privilege of another user.

8. The game apparatus according to claim 7, wherein the grouping unit is configured to divide the plurality of registered users into the plurality of groups according to the possibility by dividing the plurality of users into at least the first group having the relatively high possibility and a second group having a possibility lower than the first group;
- wherein the grouping unit is configured to grant the predetermined privilege to the predetermined user based on a determination, based on an index value associated with the predetermined user and based on a membership of the predetermined user in the first group of the plurality of groups, that the predetermined user has a possibility above a threshold.

9. The game apparatus according to claim 8, wherein the index value calculation unit is configured to calculate the index value based on a level of participation of each of the registered users in the game; and
- wherein the possibility that registered users will not perform the predetermined action is a probability that the registered users will leave the game based on the level of participation of each of the registered users.

10. The game apparatus according to claim 1, wherein the index value represents a possibility that the predetermined action, which has continued with a predetermined frequency by the registered users, will not continue with the predetermined frequency.

11. The game apparatus according to claim 1, wherein the index value calculation unit is configured to calculate the index value representing the possibility at each of a plurality of time points after a current time point.

12. The game apparatus according to claim 11, wherein the index value calculation unit is configured to periodically recalculate the index value representing the possibility after a predetermined time period.

13. The game apparatus according to claim 12, wherein the predetermined time period is the same as a length of time between a current time point and an earliest time point in the plurality of time points.

14. The game apparatus according to claim 1, wherein the log information includes a plurality of logs associated with inactive users; and
- wherein the index value calculation unit is configured to calculate the index value based on an output of a machine learning program applied to the plurality of logs associated with the inactive users.

15. The game apparatus according to claim 14, wherein the machine learning program is a convolutional neural network configured to minimize an error associated with the plurality of logs associated with the inactive users.

16. The game apparatus according to claim 1, wherein the privilege granting unit is further configured to set the predetermined privilege as expiring after a predetermined period of time.

17. The game apparatus according to claim 1, wherein the privilege granting unit is further configured to set the predetermined privilege as expiring after a predetermined number of uses to provide the at least one effect within the game.

18. The game apparatus according to claim 1, wherein the game apparatus is further configured to cause a user interface of the specific user to be modified based on a specific event associated with the predetermined privilege, wherein the user interface of the specific user is configured to be modified prior to a start of the specific event.

19. A game method executed by a computer, the method comprising:
- retrieving log information associated with user identification information related to a plurality of registered users, said log information comprising a plurality of gameplay actions executed within a game by each of the registered users and timestamp information associated with each of the plurality of gameplay actions;
- starting playing the game and progressing the game based on operation information by the registered users;
- calculating, for each of the registered users, an index value indicating a possibility that the registered users will not perform a predetermined action within a predetermined period based on the log information; and
- granting a predetermined privilege, said predetermined privilege being advantageous in the game, to a specific user of the plurality of registered users based on the calculated index value for each of the registered users.

20. A non-transitory computer-readable medium on which is embodied game program instructions that, when executed, cause a computer to execute processes of:

retrieving log information associated with user identification information related to a plurality of registered users, said log information comprising a plurality of gameplay actions executed within a game by each of the registered users and timestamp information associated with each of the plurality of gameplay actions;

starting playing the game and progressing the game based on operation information by the registered users;

calculating, for each of the registered users, an index value indicating a possibility that the registered users will not perform a predetermined action within a predetermined period based on the log information; and granting a predetermined privilege, said predetermined privilege being advantageous in the game, to a specific user of the plurality of registered users based on the calculated index value for each of the registered users.

* * * * *